(12) United States Patent  
Zimmer et al.

(10) Patent No.: US 8,274,583 B2  
(45) Date of Patent: Sep. 25, 2012

(54) RADIALLY-BASED CHROMA NOISE REDUCTION FOR CAMERAS

(75) Inventors: Mark Zimmer, Aptos, CA (US); Ralph Brunner, Cupertino, CA (US); David Hayward, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 260 days.

(21) Appl. No.: 12/755,574

(22) Filed: Apr. 7, 2010

(65) Prior Publication Data

US 2010/0309345 A1 Dec. 9, 2010

Related U.S. Application Data

(63) Continuation-in-part of application No. 12/479,592, filed on Jun. 5, 2009.

(51) Int. Cl.
*H04N 9/64* (2006.01)
*H04N 5/217* (2006.01)
*G06K 9/40* (2006.01)

(52) U.S. Cl. ......... 348/251; 348/241; 382/261; 382/274

(58) Field of Classification Search ................ 348/241, 348/251; 382/261, 262, 274, 275
See application file for complete search history.

(56) References Cited

U.S. PATENT DOCUMENTS

| | | | |
|---|---|---|---|
| 6,621,937 B1 | 9/2003 | Adams, Jr. et al. | |
| 6,670,988 B1 | 12/2003 | Gallagher et al. | |
| 6,731,806 B1 * | 5/2004 | Gindele | 382/205 |
| 6,833,862 B1 * | 12/2004 | Li | 348/207.99 |
| 7,257,271 B2 | 8/2007 | Adams, Jr. et al. | |
| 2002/0176113 A1 | 11/2002 | Edgar | |
| 2004/0070677 A1 | 4/2004 | Adams, Jr. et al. | |
| 2007/0195178 A1 | 8/2007 | Ooishi | |
| 2007/0211154 A1 | 9/2007 | Mahmoud et al. | |
| 2008/0055430 A1 * | 3/2008 | Kirsch | 348/241 |

(Continued)

FOREIGN PATENT DOCUMENTS

JP 2001155148 A * 6/2001

OTHER PUBLICATIONS

Yu, Wonpil; "Practical Anti-Vignetting Methods for Digital Cameras"; Nov. 2004; IEEE Transactions on Consumer Electronics; vol. 50, No. 4; pp. 975-983.*

(Continued)

*Primary Examiner* — John Villecco

(74) *Attorney, Agent, or Firm* — Wong, Cabello, Lutsch, Rutherford & Brucculeri, LLP

(57) ABSTRACT

A system, apparatus, computer readable medium, and method for radially-dependent noise reduction in image capturing devices involving an edge-preserving blur window are disclosed. In one embodiment, the edge-preserving blur includes only those pixels in the blur window that are within a threshold value of the blur window's current center pixel in its blurring calculation. By creating a threshold function that varies radially from the center of the image sensor's light intensity falloff function, a more appropriate threshold value can be chosen for each pixel, allowing for more noise farther from the center of the image, and allowing for less noise closer to the center of the image. Light-product information taken from the image's metadata may be used to scale the threshold value parameters dynamically. This allows the method to perform the appropriate amount of processing depending on the lighting situation of the image that is currently being processed.

25 Claims, 19 Drawing Sheets

U.S. PATENT DOCUMENTS

| | | | |
|---|---|---|---|
| 2008/0181495 A1 | 7/2008 | Spampinato et al. | |
| 2008/0284879 A1* | 11/2008 | Hu | 348/241 |
| 2009/0034866 A1 | 2/2009 | Park et al. | |
| 2009/0190006 A1* | 7/2009 | Huggett et al. | 348/241 |
| 2010/0033596 A1* | 2/2010 | Kanemitsu et al. | 348/229.1 |
| 2010/0091143 A1* | 4/2010 | Hara | 348/241 |
| 2010/0245632 A1* | 9/2010 | Suzuki | 348/241 |
| 2010/0302413 A1* | 12/2010 | Kawashima | 348/241 |
| 2010/0309344 A1 | 12/2010 | Zimmer et al. | |
| 2010/0309975 A1 | 12/2010 | Zhou et al. | |
| 2011/0085086 A1* | 4/2011 | Shi et al. | 348/624 |
| 2011/0090351 A1* | 4/2011 | Cote et al. | 348/208.1 |
| 2011/0090370 A1* | 4/2011 | Cote et al. | 348/237 |
| 2011/0090371 A1* | 4/2011 | Cote et al. | 348/237 |
| 2011/0090380 A1* | 4/2011 | Cote et al. | 348/246 |
| 2011/0090381 A1* | 4/2011 | Cote et al. | 348/246 |
| 2011/0091101 A1* | 4/2011 | Cote et al. | 382/167 |
| 2011/0228141 A1* | 9/2011 | Hou et al. | 348/241 |
| 2012/0013772 A1* | 1/2012 | Ishiga | 348/241 |
| 2012/0026368 A1* | 2/2012 | Cote et al. | 348/242 |

OTHER PUBLICATIONS

Non-Final Office Action received from the USPTO for U.S. Appl. No. 12/479,592, dated Oct. 27, 2011.

Response to Office Action (dated Oct. 27, 2011) for U.S. Appl. No. 12/479,592; dated Jan. 10, 2012.

* cited by examiner

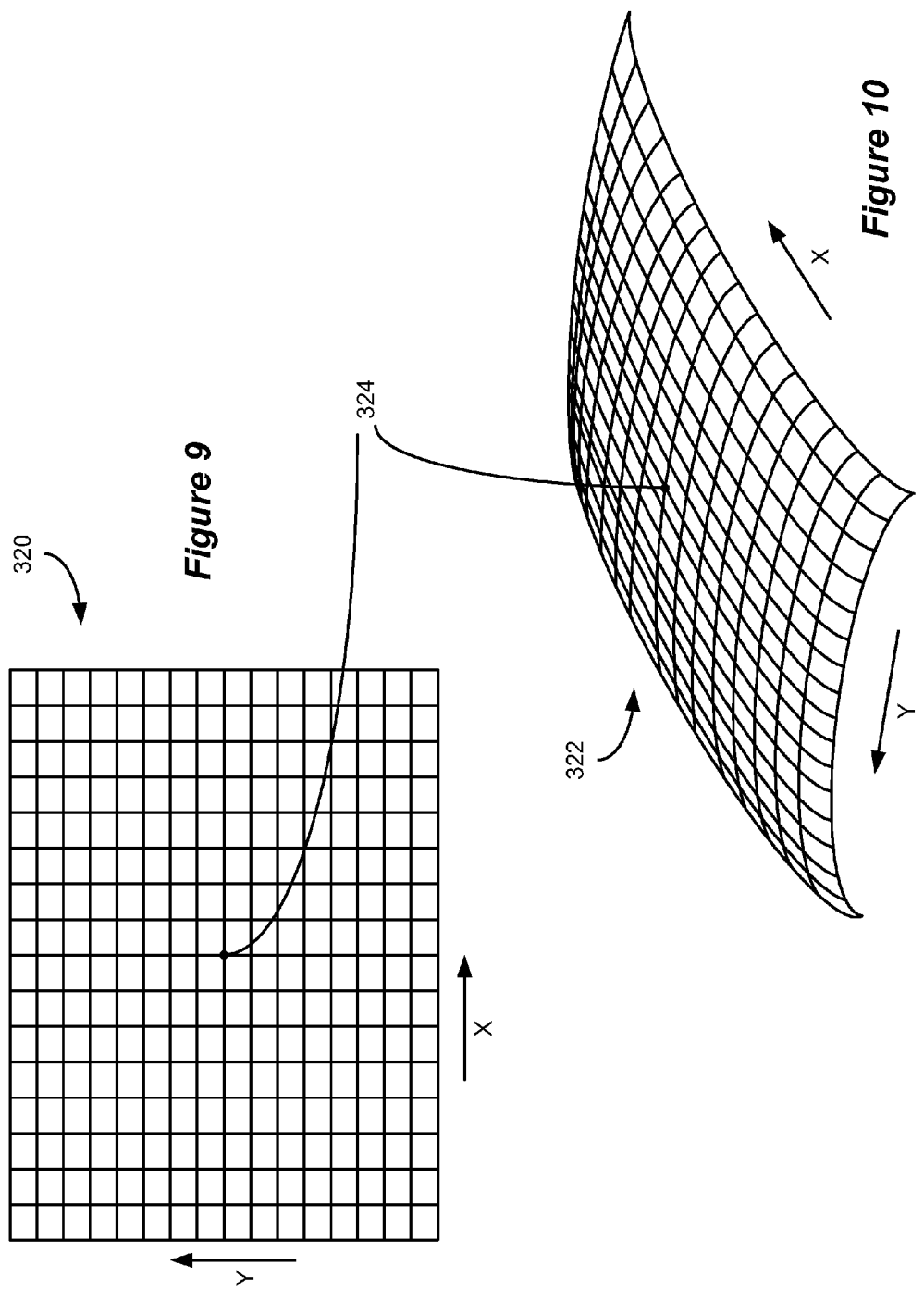

RADIALLY-BASED CHROMA NOISE REDUCTION FOR CAMERAS

CROSS-REFERENCE TO RELATED APPLICATION

The present application is a continuation-in-part of U.S. application Ser. No. 12/479,592, filed Jun. 5, 2009, and entitled, "Chroma Noise Reduction for Cameras" (hereinafter, "the '592 application"). Priority is claimed to the '592 application, and the '592 application is also hereby incorporated by reference in its entirety.

BACKGROUND

Today, many personal electronic devices come equipped with digital cameras. Often, these devices perform many functions, and, as a consequence, the digital image sensors included in these devices must often be smaller than sensors in conventional cameras. The digital image sensor, such as a charge-coupled device (CCD), of a digital camera has a plurality of photo-sites arranged in a colored filtered array or pattern, such as a RGB Bayer pattern. In the RGB Bayer pattern, each photo-site is filtered so that it is receptive to either: red, green, blue, or some variation thereof. The type of colored filter array and digital imaging sensor varies, typically based on the manufacturer of the digital camera. For example, some color filtered arrays use a pattern of yellow, cyan, green, and magenta. Typically, the digital camera has an image pipeline that performs a demosaicing or de-Bayering process on the image, lens correction, and noise reduction. The image pipeline then performs RGB gamma correction and tone mapping on the image data and encodes the image into the YCbCr family of color spaces or other format suitable for displaying and viewing.

Various considerations must be addressed when processing a digital image obtained with a digital camera, digital video camera, or other imaging device. One consideration involves the large amount of image noise resultant from the use of small camera sensors, due to their typically smaller image sensor sites. Increased noise in pixels is typically caused by the random arrival times of visible light photons to the sensor photosites, but may also be caused by the process of reading the pixel values from the sensor photosites, or for any number of other reasons, and is usually made worse by low light conditions. Although noise can lead to a grainy appearance in images due to the pattern of the color filter array, increased noise also leads to increased false colors in images.

Due to a phenomenon known as "lens falloff," the amount of light reaching off-center positions of a sensor is often less than the amount of light reaching the more central positions of the sensor. This imaging phenomenon causes the image intensity to decrease radially toward the edges of an image, creating an effect known as "vignetting." The amount of vignetting present in an image depends upon the geometry of the lens and will vary with various lens properties such as focal length and f-stop. The vignetting effect is more apparent in lenses of lower f-stop (e.g., larger aperture), which are often used in consumer cameras and digital video recorders. Another consequence of the lens falloff effect is that there is often more noise found in pixels farther radially from the center of the sensor or, more precisely, farther radially from the center of the sensor's light intensity falloff function, which may or may not be at the geometric center of the sensor.

To correct for this lens falloff phenomenon, a technique known as "flat fielding" can be performed which compensates for the different gains and dark current levels over the surface of the detector. Once a detector has been appropriately flat-fielded, a uniform signal will create a uniform output. Due to the lens falloff effect, flat fielding often disproportionately boosts the intensities of pixels near the outer edges of the sensor so that they are in line with the intensities measured near the center of the sensor when exposed to the same uniform signal. As a consequence, the greater noise levels found in the pixels located closer to the outer edges of the sensor are also magnified to a greater degree than the noise levels in pixels near the center of the sensor.

To compensate for reduced performance in smaller camera sensors, various processing techniques may be implemented. However, most existing noise reduction techniques either produce a blotchy appearance in the images or are too computationally expensive to be used. Thus, there is need for a low computational cost, radially-based system and method for reducing noise effects in image capturing applications to create more visually appealing images.

SUMMARY

One embodiment of an improved method for noise reduction in image capturing devices works by using a cross-shaped, edge-preserving blur on the chroma (CbCr) plane of the image. For image data that is encoded into the YCbCr family of color spaces, the Y stands for the luminance signal, i.e. brightness, the Cb stands for the "blue difference" chroma component, i.e. B-Y, and the Cr stands for the "red difference" chroma component, i.e., R-Y. The Cb and Cr values together are often referred to as the "chroma space" or "chroma plane" of the image. The edge-preserving chroma blur described herein is said to be "cross-shaped" because, in one embodiment, the blurring process is divided into a horizontal pass as well as a vertical pass over the image's pixels. Using a cross-shaped blur can increase the efficiency of the noise reduction method because the second, e.g., vertical, pass can re-use the results of the first, e.g., horizontal pass. Alternatively, it is also possible to use an actual cross-shaped kernel and make only a single pass over the CbCr data.

In one embodiment, the cross-shaped blur can include only those pixels in the blur window that are visually close, e.g., close in color, to the blur window's current center pixel (as measured by the sum-of-absolute-differences or other color distance measurement techniques) in its blurring calculation. Limiting the pixels considered in the blur to those that are visually close, i.e., within a threshold value, to the center pixel ensures that the image's colors don't get blurred along color edges within the image. For example, it would not be desirable to blur the edges between a red stripe and a blue stripe on a striped shirt in an image. Blurring across different color bands would produce color shifts and desaturation along those color edges.

By creating a threshold value function that varies radially from the center of the image sensor's light intensity falloff function, a more appropriate threshold value can be chosen for each pixel. This radially-dependent threshold value function can then be used by a blurring function, e.g., a two-dimensional, cross-shaped blur. The use of a radially-dependent threshold value function will allow for greater edge preservation in the image by allowing for more noise where more noise is expected in the image, i.e., in those area farther from the center of the image sensor's light intensity falloff function, and allowing for less noise in those areas where less noise is expected in the image, i.e., near the center of the image sensor's light intensity falloff function.

Light-product information taken from the image's metadata, for example, the camera sensor's gain level, may then be used to scale each pixel's threshold value dynamically. This allows the method to perform the appropriate amount of blurring depending on the lighting situation of the image that is currently being processed.

To further reduce noise artifacts typically found in portions of an image that are close to a neutral color, e.g., white or gray, one embodiment described herein can desaturate these portions of the image before or after performing the blurring operation on the image. Desaturation essentially "snaps" the color values of the identified pixels to be equal to the exact value of the neutral color that they likely represent. For instance, if a pixel's chrominance values indicate that it is almost white (or almost gray), then it is most likely that the pixel is actually supposed to be pure white (or pure gray). Thus, if a noise artifact is found in such a portion of the image, the artifact color can be forced to match, i.e., snapped, to the value of the pure neutral color, thus eliminating the noise artifacts in that region of the image.

Because of efficiencies gained by the embodiments disclosed herein, the edge-preserving blur method described below may be implemented directly in an image sensor's hardware, thus making the method readily applicable to any number of electronic devices possessing digital cameras, such as digital video cameras, mobile phones, personal data assistants (PDAs), portable music players, or laptop/desktop computers. Alternatively, the edge-preserving blur method described below may be implemented in other hardware within the electronic device.

BRIEF DESCRIPTION OF THE DRAWINGS

FIG. 9 illustrates a 16×16 sample intensity value grid in accordance with one embodiment.

FIG. 10 illustrates a perspective view of sampled intensity levels over the surface of an image sensor in accordance with one embodiment.

DETAILED DESCRIPTION

This disclosure pertains to an apparatus, computer useable medium, method, and processor programmed to perform improved, radially-dependent chroma noise reduction in captured images. While this disclosure discusses a new technique for improved chroma noise reduction in captured images, one of ordinary skill in the art would recognize that the techniques disclosed may also be applied to other contexts and applications as well. The techniques disclosed herein are applicable to any number of electronic devices with digital image sensors, such as digital cameras, digital video cameras, mobile phones, personal data assistants (PDAs), portable music players, and computers. An embedded processor, such a Cortex® A8 with the ARM® v7-A architecture, provides a versatile and robust programmable control device that may be utilized for carrying out the disclosed techniques. (CORTEX® and ARM® are registered trademarks of the ARM Limited Company of the United Kingdom.)

Figure 1:
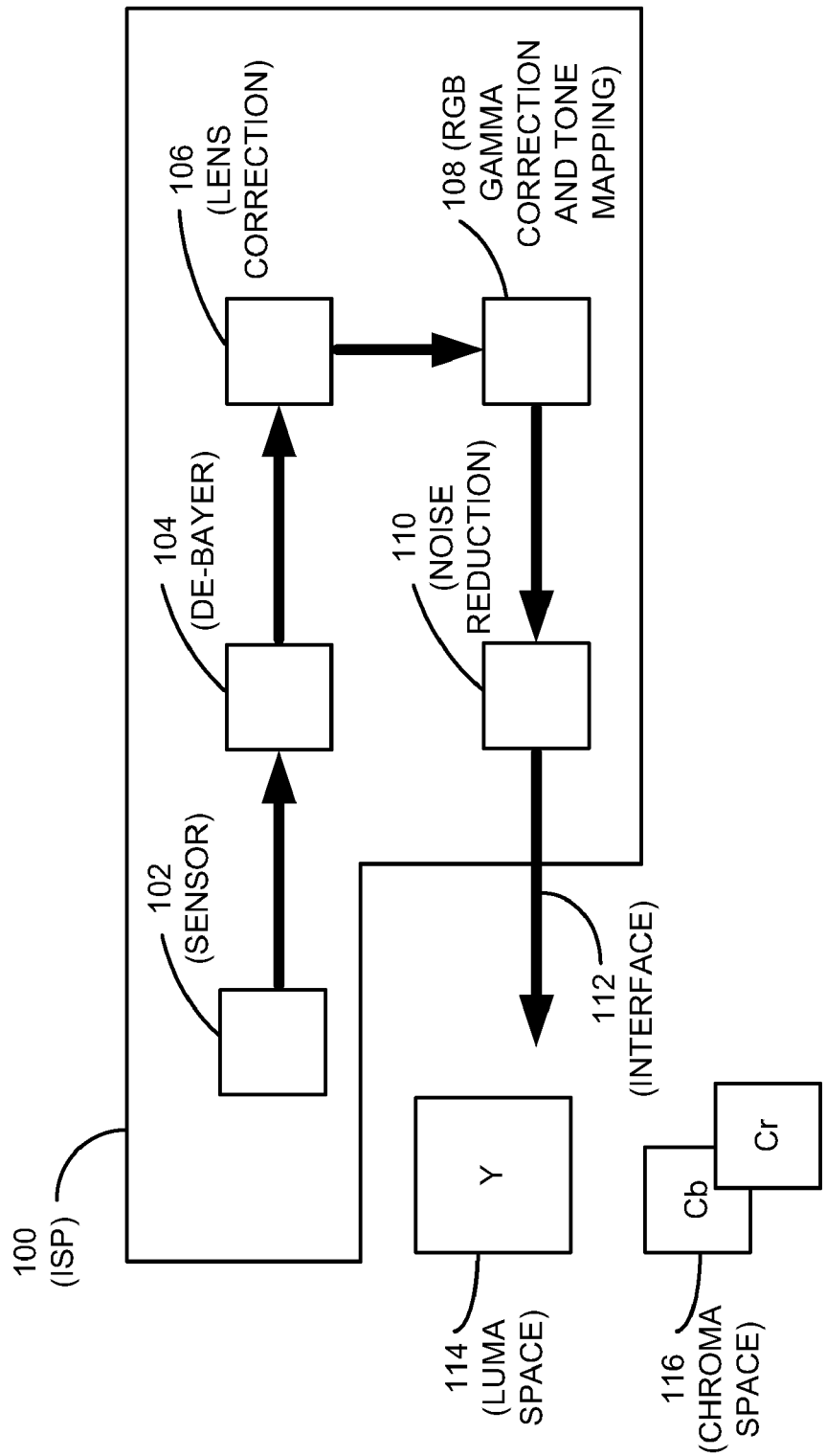
FIG. 1 illustrates a prior art image sensor package in accordance with one embodiment.

Referring to FIG. 1, a block diagram of one embodiment of a prior art image sensor package (ISP) 100 is shown. The ISP 100 may include a digital image sensor 102, such as a CMOS or CCD image sensor. Digital image sensor 102 may send its image information to a demosaicing or de-Bayering process 104, as is well known in the art. Next, the ISP can perform lens correction 106 to correct the image for various lens distortions including vignetting artifacts, i.e., light fall-off towards the edges of the frame, and color uniformity. The image data can then be sent to an RGB gamma correction and tone mapping process 108 and passed through noise reduction filter 110 to remove any "noise" pixels. Finally, the image data may be encoded into the YCbCr family of color spaces and passed over interface 112 for any further processing and/or display by the device.

Figure 2:
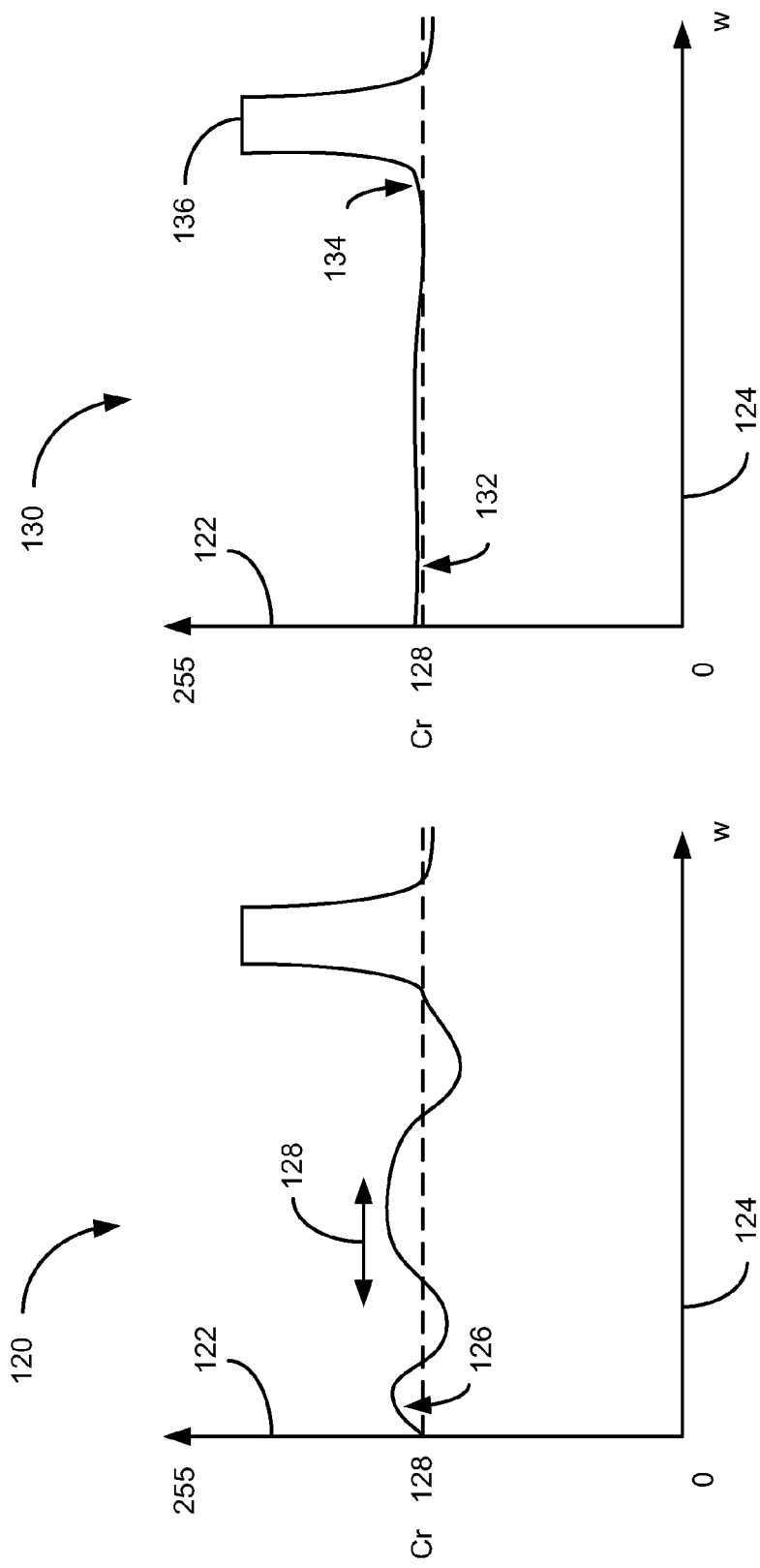
FIG. 2 illustrates the effects of an edge-preserving, blurred noise reduction filter in accordance with one embodiment.

Referring now to FIG. 2, graph 120 shows the Cr values of the pixels in an exemplary single row of image data before an edge-preserving, blurred noise reduction filter has been applied to the exemplary single row of image data. Graph 130 shows the Cr values of the pixels in the same exemplary single row of image data after an edge-preserving, blurred noise reduction filter has been applied to the exemplary single row of image data. The y-axes of the graphs 122 represent chrominance values, in this case red chrominance data, or Cr. The x-axes of the graphs 124 represent the pixels across an exemplary single horizontal row of pixels in an image, with the pixel at the left edge of the image represented at zero along the x-axis, and the pixel at the right edge of the image represented at w along the x-axis. For each pixel in the exemplary single row of image data, the pixel has both a Cb and a Cr value. Graphs 120 and 130 show only Cr data for simplicity. Typically, chroma data can be stored as an 8-bit number, ranging from 0 to 255, with 0 representing the minimal Cr value (most cyan), 128 representing neutral (when both Cb and Cr are 128, the color is gray), and 255 representing the maximal Cr value (most red). Element 128 represents an array of pixels that would be contained in a blur window at a given instant during noise reduction filtering. The role of the blur window will be described in more detail later. Element 126 represents an example of noise in the exemplary row of image data. Specifically, a small group of pixels centered around element 126 appear to have a somewhat different Cr value than nearby pixels, but they probably do not represent a different color region in the image. Instead, it is more likely that region 126 represents noise pixels. Graph 130 shows the result of the application of the edge-preserving blur that is described in greater detail below. Element 132 represents a region where the Cr values in noise region 126 have been effectively blurred. The pixels in region 132 now have more similar values to their surrounding pixels in the image, thus reducing this region of probable noise in the image. Element 134 represents a region in the image where there was likely a color edge in the image. Element 136 represents this second color region. Notice that the pixels in region 136 generally have a much different Cr value than the pixels in region 132. Because region 134 in the image represents a probable color edge in the image, it is preferable not to blur the image data at this edge. Blurring in this region might cause the image to lose crisp color edges in the areas where two different colors abut, leading to an undesirable fuzzy look in the image. As is described further below, the edge-preserving, blurred noise reduction filter method described herein can identify these color edges and reduce the amount of blurring performed in this area. This lack of blurring can be seen in graph 130 by the fact that the image data maintains a steep increase in Cr values at region 134. If the region had been blurred, the steep increase at region 134 would have been smoothed out significantly, appearing as a more rounded bend in the graph.

Figure 3:
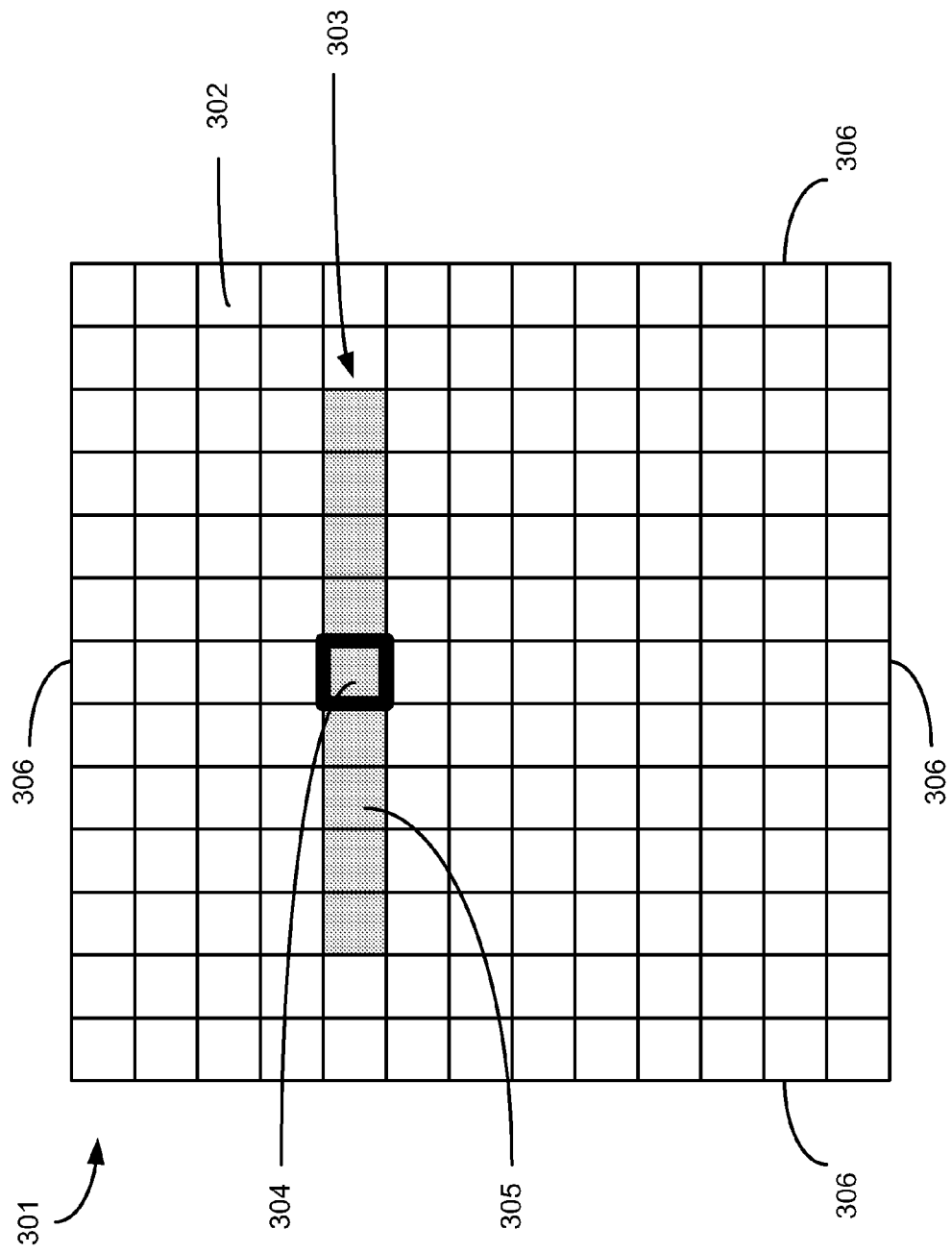
FIG. 3 illustrates a blur window passing through a non-border condition in accordance with one embodiment.

Referring now to FIG. 3, there is illustrated a typical blur window 303 that may be used to blur the pixels of an image in an effort to reduce unwanted noise in the image. To reduce noise in an image 301, every pixel 302 in image 301 may be adjusted according to other pixels around it, for example, the pixels within blur window 303. To adjust a pixel 302, a blur window 303 may be centered around a particular pixel to be adjusted, hereinafter called a center pixel 304. A blur window 303 may extend out in two directions from a center pixel 304, either horizontally or vertically, in one embodiment encompassing an equal number of pixels in each direction. It is also possible to use an asymmetrical blur window that extends out, for example, N1 pixels in a first direction from the center pixel and N2 pixels in a second, opposite, direction from the center pixel. A number of factors may go into the selection of the number of pixels that are in a blur window. For example, the number of window pixels may depend on the type of noise that is trying to be reduced, the format of the data, or a number of other factors. In FIG. 3, the value of both N1 and N2 is four, for exemplary purposes. In another embodiment, N1 and N2 may each be set to a value of eight. All window pixels 305 making up blur window 303 may be utilized in a calculation to transform one or more values, e.g., Cb or Cr value, of center pixel 304, including the value of the center pixel itself when blur window 303 is in a border condition, as will be described below.

In FIG. 3, blur window 303 is in a non-border condition, that is, the entire blur window 303 lies within the borders 306 of image 301. In one embodiment, a blur window transforms an original value, e.g., Cb or Cr, of center pixel 304 into a new value, e.g., Cb' or Cr', according to the following equations:

$$C'_{b_0} = \frac{\sum_{n=-N1}^{N2}(C_{b_n}T_n)}{\sum_{n=-N1}^{N2}(T_n)}, \quad \text{(Eqn. 1)}$$

wherein: If $|C_{b_n} - C_{b_0}| + |C_{r_n} - C_{r_0}| > \Gamma$,
Then $T_n = 0$, Else $T_n = 1$.

$$C'_{r_0} = \frac{\sum_{n=-N1}^{N2}(C_{r_n}T_n)}{\sum_{n=-N1}^{N2}(T_n)}, \quad \text{(Eqn. 2)}$$

wherein: If $|C_{b_n} - C_{b_0}| + |C_{r_n} - C_{r_0}| > \Gamma$,
Then $T_n = 0$, Else $T_n = 1$.

$C_{b_0}$ and $C_{r_0}$ are the original Cb and Cr values associated with center pixel 304. $\Gamma$ represents a threshold value that may be constant for each pixel in the image or may be calculated by evaluating a threshold value function for each pixel that is based on the pixel's radial or horizontal distance from the center of the image and one or more predefined threshold parameters, as will be described in further detail later. Alternatively, threshold values may be set for groups of pixels, e.g., pixels within a given distance range from the center of the image sensor's light intensity falloff function. The equation element, $|C_{b_n}-C_{b_0}|+|C_{r_n}-C_{r_0}|$, as seen in Equations 1 and 2 above, is an exemplary distance function for measuring the difference in color between the center pixel and the nth pixel in the blur window. The distance function may be used in the calculation of $T_n$. Typically, each type of distance function (for example, an "absolute difference" distance function is used in Equations 1 and 2 above) will have its own threshold value function and threshold parameters. Another example of a distance function that could be used in determining $T_n$ is the Euclidian distance function, which could be implemented as: If $(C_{b_n}-C_{b_0})^2+(C_{r_n}-C_{r_0})^2>\Gamma^2$, Then $T_n=0$, Else $T_n=1$. The threshold value may also be scaled dynamically and based on image metadata, such as, but not limited to, gain or exposure time. For example, in low light conditions, gain may be higher, and it may be beneficial to set the threshold higher.

Equations 1 and 2 have the effect of, for each pixel in the image, transforming the Cb and Cr values of that pixel (e.g., pixel 304 is currently being transformed in FIG. 3) to be the average of the Cb and Cr values of those pixels within its blur window (e.g., the grayed pixel squares in FIG. 3) whose Cb and Cr values are within a given threshold of the Cb and Cr values of the pixel whose values are currently being transformed (e.g., pixel 304 in FIG. 3). This allows the noise reduction process to simultaneously blur out noise in the image, while still respecting color edge boundaries within the image. Other embodiments of Equations 1 and 2 may generate values that are not weighted means, but that still transform the Cb and Cr values of each pixel in the image based on the Cb and Cr values of nearby pixels that meet some predetermined criteria.

In some embodiments of Equations 1 and 2 above, it may be possible to allow the values of certain pixels in the blur window to be disproportionately emphasized or deemphasized based on some predetermined criteria. For example, the value of $T_n$ in Equations 1 and 2 above could be specified to be some value between zero and one based on the evaluation of the color distance function and its closeness to the threshold value, $\Gamma$, for the given pixel.

Because Equations 1 and 2 require a computationally expensive division operation for each pixel, it may be preferable to pre-generate a table of values equal to the reciprocals of the possible denominators of Equations 1 and 2. Specifically, the denominator in Equations 1 and 2 will always be between 1 and (N1+N2+1), i.e., the denominator would be equal to (N1+N2+1) if the color value of each pixel within the blur window fell within the threshold of the center pixel's color value, and the denominator will be equal to 1 if none of the pixels within the blur window fell within the threshold of the center pixel's color value (the denominator is always at least 1 because the center pixel always falls within the threshold of itself). Alternatively, the processor could be used to perform a quick reciprocal estimate operation to generate the values of 1/1, 1/2, 1/3, 1/4 . . . 1/(N1+N2+1) needed for the calculation. The values of Cb' and Cr' could then be computed by performing a multiplication operation, which is substantially faster than a full-precision division operation on most hardware. Alternatively, the division operation itself could be carried out by a more powerful processor than that used in the typical ISP.

Figure 4:
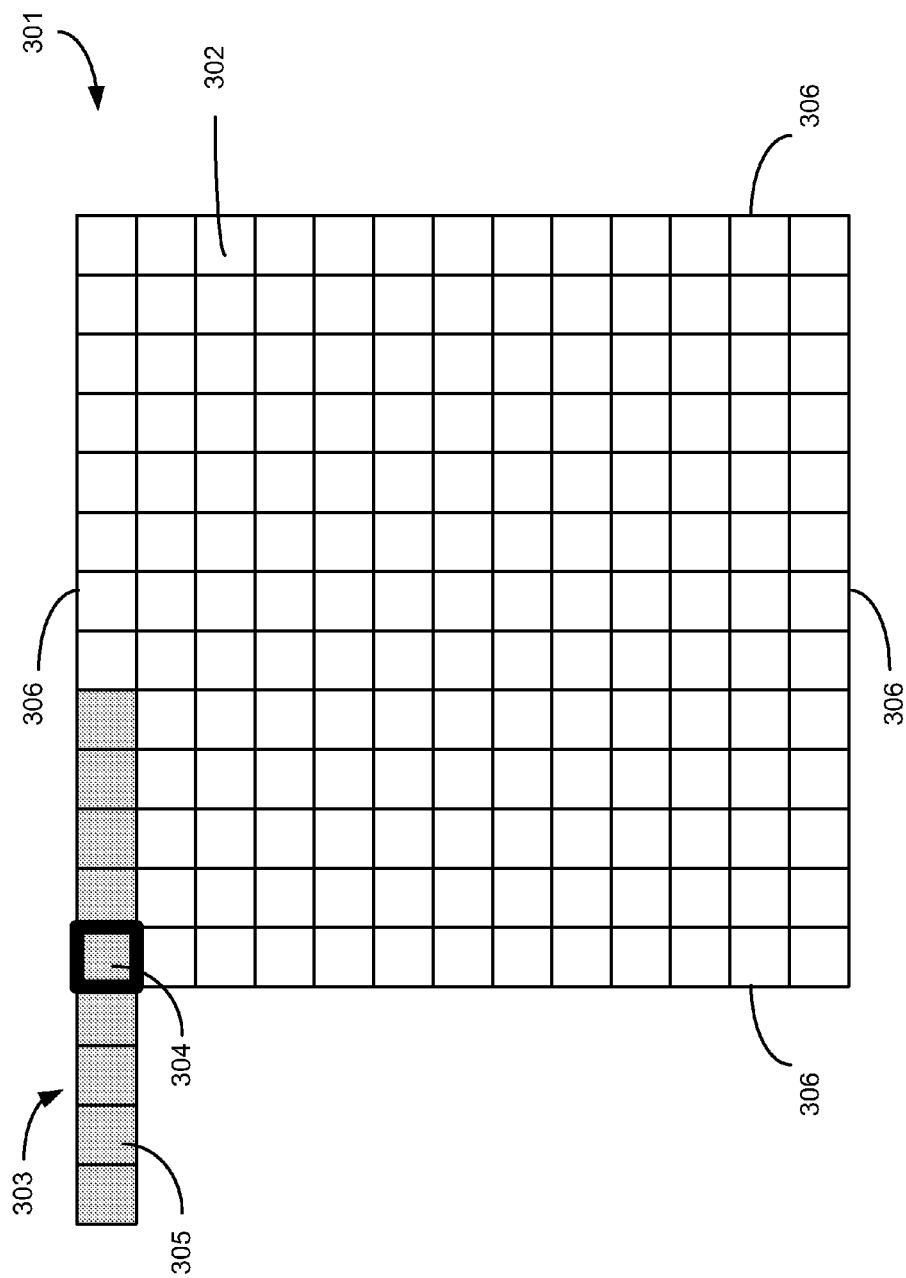
FIG. 4 illustrates a horizontal blur window in a border condition beginning a horizontal pass through an image in accordance with one embodiment.

FIG. 4 illustrates a blur window 303 passing through an image 301 in a border condition. A blur window 303 is in a border condition when at least one window pixel 305 lies outside the borders 306 of image 301. In one embodiment, the $C_{b_n}$ and $C_{r_n}$ of each window pixel 305 lying outside the borders 306 of image 301 are considered to contain the Cb and Cr values of the pixel closest to the border of the image, which, in FIG. 4, is center pixel 304. Alternatively, the $T_n$ values for the pixels outside the border can be set to 0. Then, Equations 1 and 2 are used as above to calculate $C'_{b_0}$ and $C'_{r_0}$ for each pixel in the image where noise reduction is desired.

Figure 5:
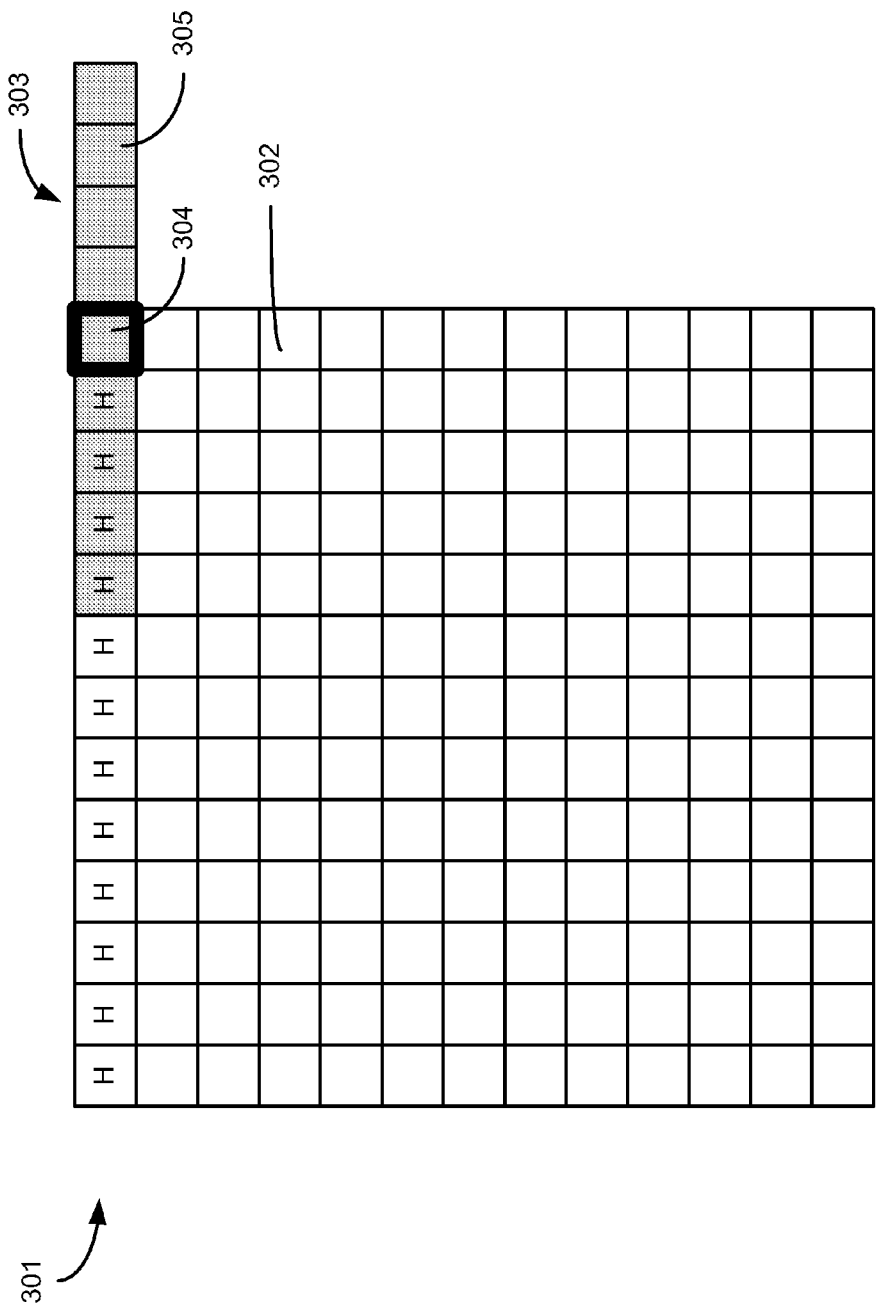
FIG. 5 illustrates a horizontal blur window completing a horizontal pass through an image in accordance with one embodiment.

FIG. 5 illustrates a horizontal blur window 303 finishing a pass through a first row of pixels 302 in an image 301. In one embodiment, a horizontal blur window 303 may begin in a top corner of the image 301 and pass through each pixel 302 of the image 301, descending row by row until the entire image 301 has been covered by blur window 303. The 'H's in the pixels 302 in the first row of image 301 indicate that the blurred values, i.e., $C'_{b_0}$ and $C'_{r_0}$, for that pixel have been calculated by the horizontal blur window 303 and written to, e.g., a buffer in the memory 145 of ISP 150 (See FIG. 12).

Figure 6:
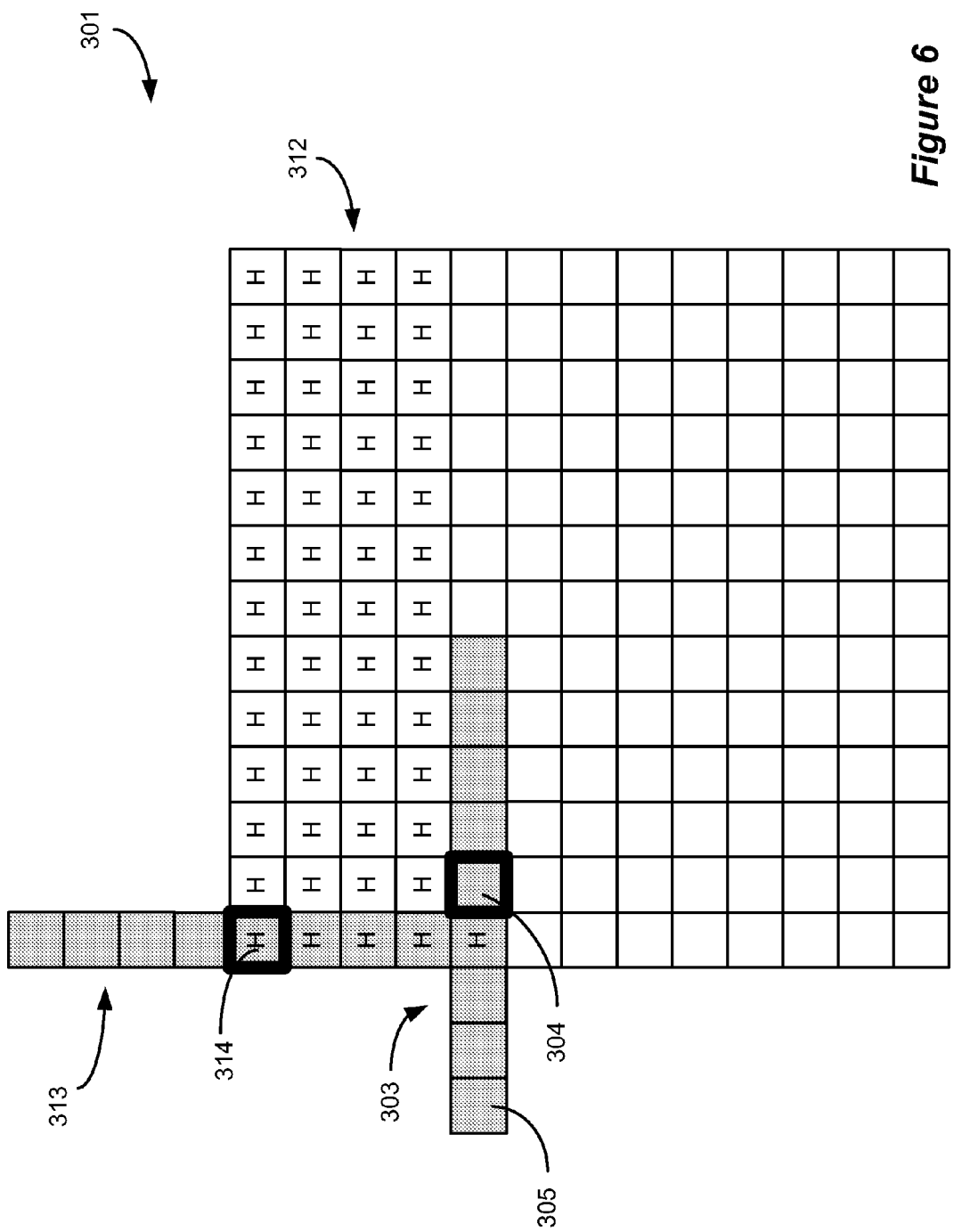
FIG. 6 illustrates a horizontal blur window completing a horizontal pass through a sufficient number of rows to allow a vertical blur window to begin a first vertical pass through a column of pixels in accordance with one embodiment.

FIG. 6 illustrates one embodiment of a cross-shaped, edge-preserving noise reduction blur that has reached a point in the blurring process wherein a vertical blur window 313 may begin to vertically blur the already horizontally-blurred pixels 312 of image 301. In one embodiment, for vertical blur window 313 to begin, a horizontal blur window 303 must have filtered at least as many pixels in a first column as are present in half of the vertical blur window 313, plus one additional pixel representing the vertical blur window 313's center pixel 314. In other words, horizontal blur window 303 must process M2+1 pixels in a given column before vertical blur window 313 may begin blurring the corresponding horizontally-blurred pixel values that were written to the memory buffer by the horizontal blurring function. In another embodiment, horizontal blur window 303 must process M1+M2+1 pixels in a given column before vertical blur window 313 may begin blurring the corresponding horizontally-blurred pixel values, where M1 and M2 represent the number of pixels in each direction from the center pixel of a vertical blur window. The horizontal and vertical blur windows may be, but do not have to be, equal to each other in size. By the time vertical blur window 313 has blurred a given pixel, the pixel will have been blurred according to Equations 1 and 2 in both the horizontal and vertical directions, and the resulting Cb' and Cr' values of the pixel may be written out to a final image file. In an alternative embodiment, the entire horizontal blurring process may be performed in its entirety before beginning the vertical blurring process. In yet a further alternative embodiment, the entire vertical blurring process may be performed in its entirety before beginning the horizontal blurring process.

Figure 7:
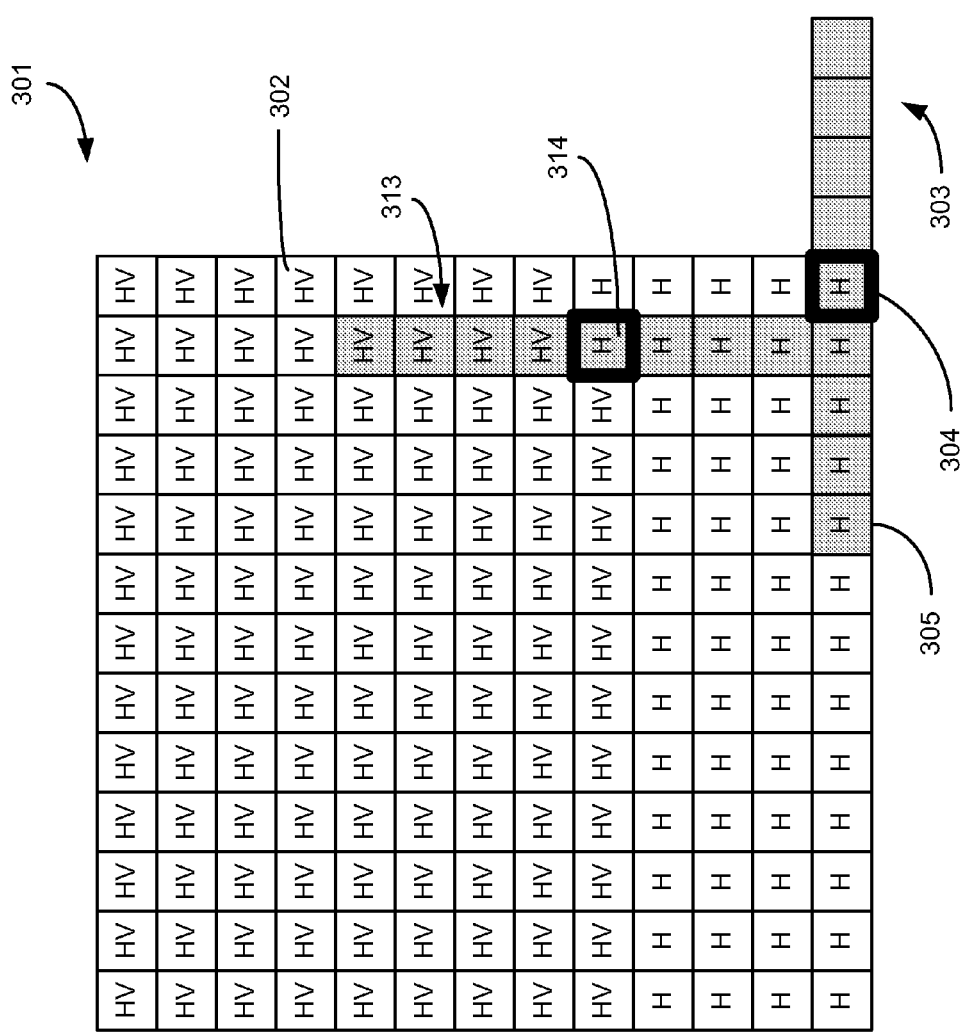
FIG. 7 illustrates a horizontal blur window completing the final horizontal pass through an image and the corresponding progress of the vertical blur window in accordance with one embodiment.

FIG. 7 illustrates a horizontal blur window 303 completing its pass through an image 301. The 'HV's in the pixels 302 of image 301 indicate that the blurred values, i.e., $C'_{b_0}$ and $C'_{r_0}$, for that pixel have been calculated by the horizontal blur window 303, written to a memory buffer, e.g., in cacheable memory, and then retrieved by vertical blur window 313 and blurred in the vertical direction, resulting in a pixel that has had a "cross-shaped" blur applied to it. That is, the pixel has been blurred in both the 'H' and 'V' directions. The resulting Cb' and Cr' values for each 'HV' pixel are then written out to a final image file along with the original Y values for the image.

Figure 8:
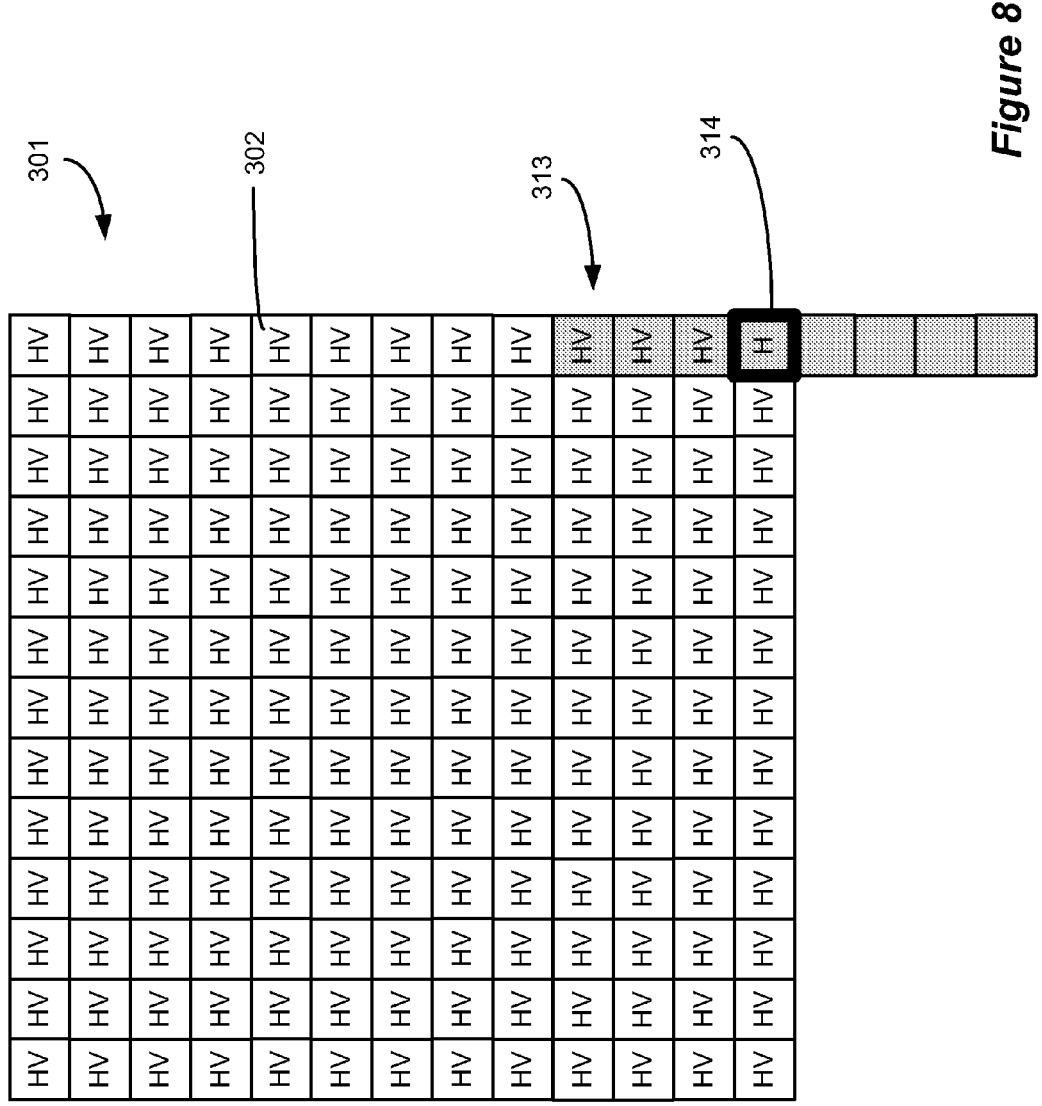
FIG. 8 illustrates a vertical blur window completing the final vertical pass through an image in accordance with one embodiment.

FIG. 8 illustrates a vertical blur window 313 completing its pass through an image 301. There are 'HV's in all but the last pixel of image 301 in FIG. 8, indicating that the cross-shaped, edge-preserving blur process will be completed as soon as the final transformed pixel values for center pixel 314 are written to the output image file.

FIG. 9 illustrates a 16×16 grid of samples 320 that measure intensity variations across the image sensor in accordance with one embodiment. Center point 324 represents the geometric center of sample grid 320. The grid of samples represents measurements of the light intensity falloff function. This function is measured in red, green, and blue. Although shown as such in FIG. 10, note that the center of the image sensor's light falloff function 322 may not necessarily be at the geometric center point 324 of the image sensor. The intensity sample grid 320 may be covered by photosensors arranged in any of a number of popular Bayer patterns, e.g, GRGB or RGGB, to collect light intensity levels at various wavelengths. As is well known in the art, the raw output of Bayer-filter cameras is referred to as a Bayer pattern image, and, to obtain a full-color image, various demosaicing algorithms can be used to interpolate a set of complete red, green, and blue values for each pixel. The x- and y-axis directions in FIG. 9 were chosen arbitrarily so that the sensor's orientation may be compared from Figure to Figure, and are not limiting in any way.

FIG. 10 illustrates a perspective view of a 16×16 intensity sample grid over a conceptual falloff function of light intensity 322 across the surface of an image sensor, in accordance with one embodiment. The shape of the conceptual falloff function of light intensity 322 as shown in FIG. 10 is partly due to the fact that most lenses have a somewhat curved, or convex, surface, resulting in the amount of light reaching off-center positions of the lens often being less than the amount of light reaching the more central positions of the lens. The shape of conceptual falloff function of light intensity 322 is also partly due to the microlenses above each photosite in the actual image sensor. As mentioned above, this imaging phenomenon known as "lens falloff" typically causes the image intensity to decrease radially toward the edges of an image, creating an effect known as "vignetting." This vignetting effect is greatly exacerbated with small image sensors, such as those found in many portable consumer electronic devices. In other embodiments, lenses may also be asymmetrical, resulting in an even more complex vignetting pattern, e.g., a lens that experiences greater average light intensity drop off on one side of the lens than the other side of the lens when exposed to a uniform signal.

Figure 11:
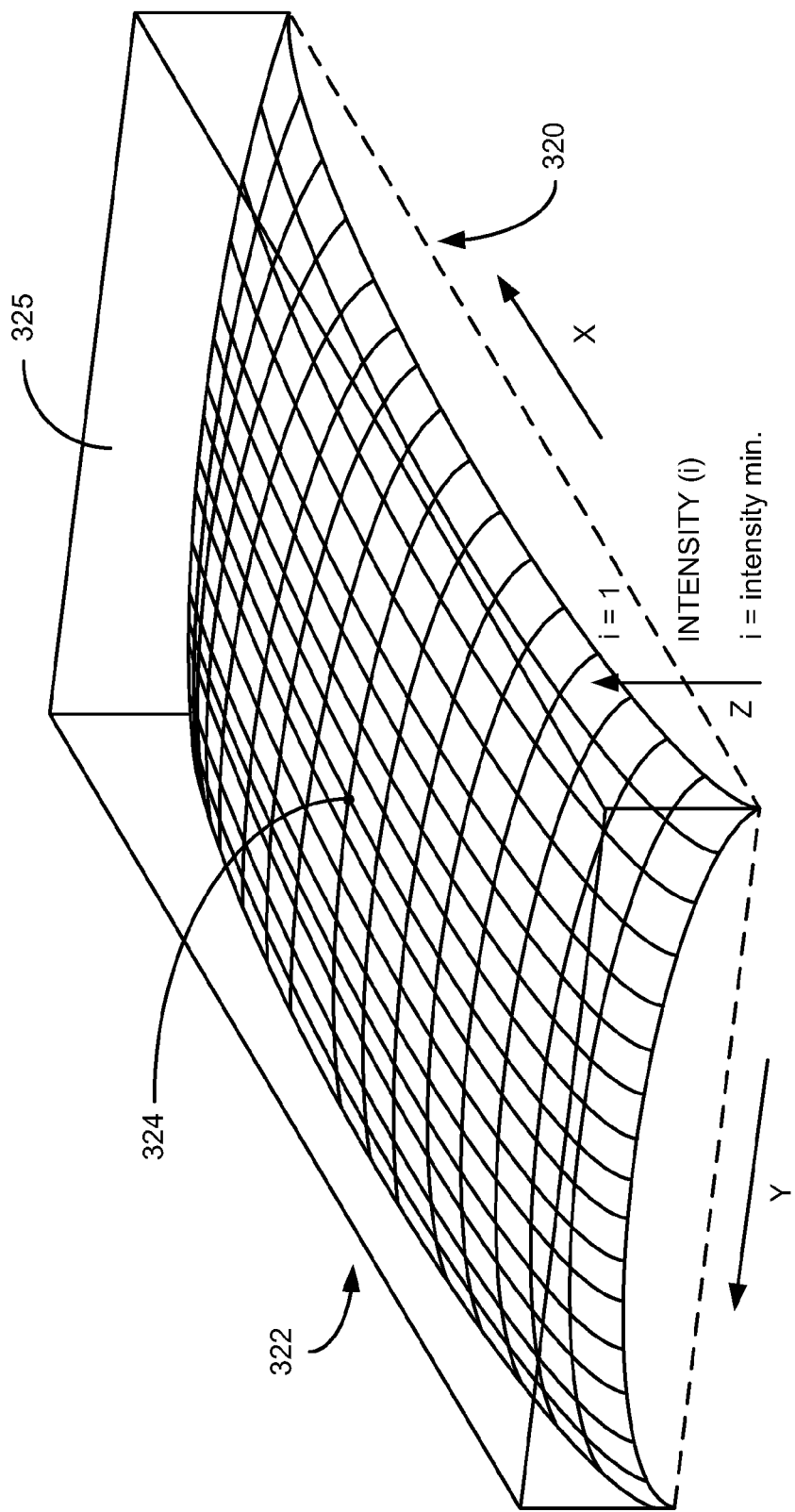
FIG. 11 illustrates a perspective view of sampled intensity levels over the surface of an image sensor in accordance with one embodiment.

FIG. 11 illustrates the effects of a technique known as "flat fielding" by showing a perspective view of average intensity levels 322 over the surface of a 16×16 intensity sample grid 320 in accordance with one embodiment. The flat fielding technique can be used to remove artifacts from the image that are caused by, e.g., variations in the pixel-to-pixel sensitivity of the sensor, such as different gains and dark current levels, or by distortions in the optical path. Once the sensor has been appropriately flat-fielded, a uniform signal will create a uniform output, represented in FIG. 11 by level intensity plane 325. Due to the lens falloff effect, flat fielding often disproportionately boosts the intensities of pixels near the outer edges of the sensor so that they are in line with the intensities measured near the center of the sensor when the sensor is exposed to the a uniform signal. In FIG. 11, the z-axis represents average pixel intensity.

Figure 12:
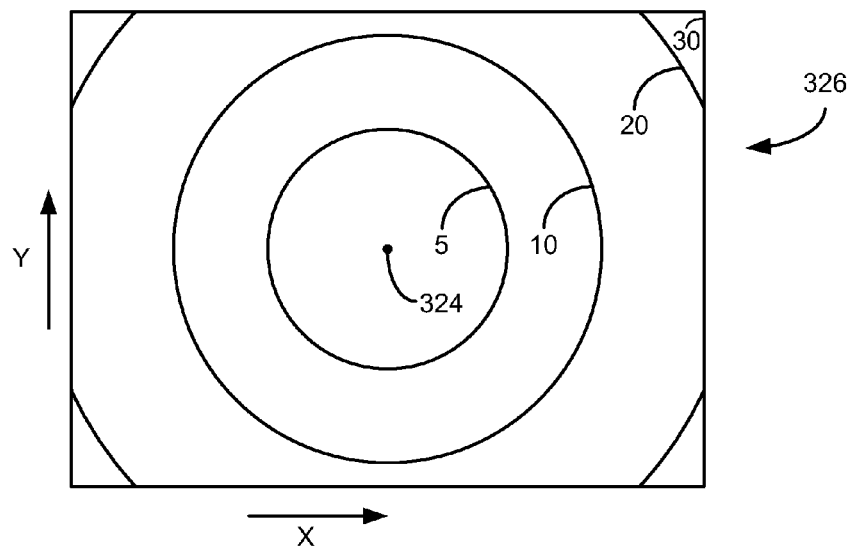
FIG. 12 illustrates a graph of radially-dependent expected noise level rings over an image in accordance with one embodiment.

As a consequence, the greater noise levels found in the pixels located closer to the outer edges of the sensor are also magnified to a greater degree than the noise levels in pixels near the center of the sensor by the flat fielding effect, creating images that are noisier and thus less visually pleasing around the outer edges. FIG. 12 illustrates a graph 326 of radially-dependent expected noise level topological rings over an image in accordance with one embodiment. As can be seen, the expected noise in an image increases for pixels that are radially farther away from center point 324, representing the center of the image sensor's light intensity falloff function. The concentric topological rings labeled as '5', '10', '20,' and '30' are merely exemplary and meant to show the general radial increase in noise moving outward from center point 324. As will be explained further below, exemplary threshold value functions may be piecewise-defined, i.e., change in value only at discrete distance intervals from the center point 324, or be continuously defined, e.g., by a polynomial or other function that is a function of the radial, horizontal, or other measure of distance between the center point 324 and the pixel that is being blurred.

Figure 13:
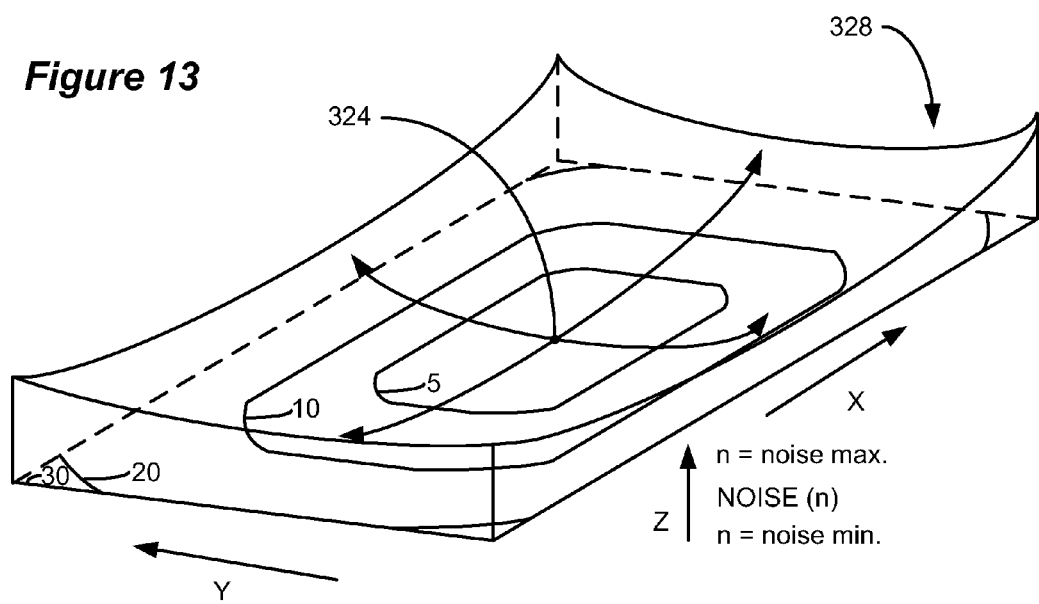
FIG. 13 illustrates a perspective view of radially-dependent expected noise level rings over an image in accordance with one embodiment.

FIG. 13 illustrates a perspective view 328 of the radially-dependent expected noise level topological rings over an image in accordance with one embodiment. In FIG. 13, the z-axis represents average noise level in the image. As shown in FIG. 13, the expected noise levels peak towards the edges of the images, coincident with the parts of the lens that are likely to receive the lowest amount of incident light.

Figure 14:
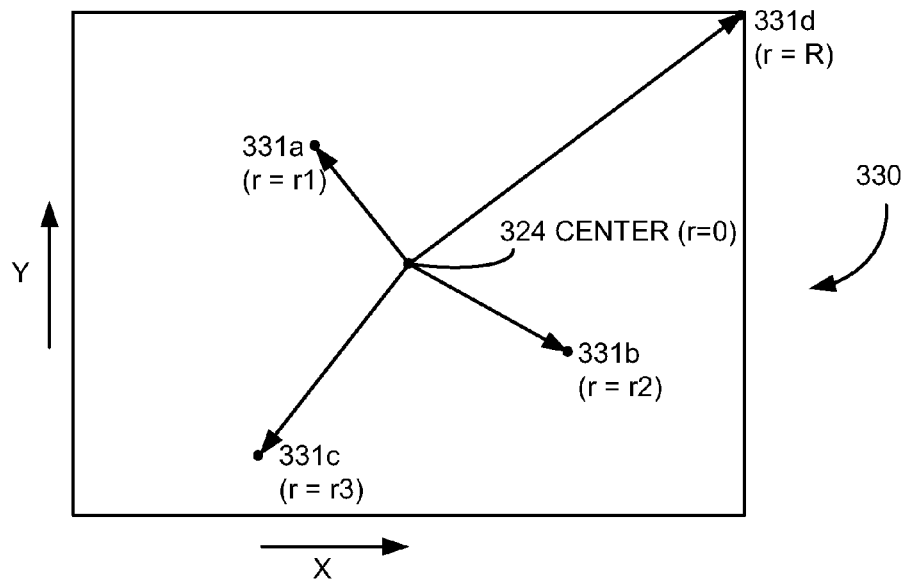
FIG. 14 illustrates a graph of various pixels with different radial distances from the center of the image sensor's light intensity falloff function in accordance with one embodiment.

FIG. 14 illustrates a graph 330 of various pixels 331 with different radial distances from the center of the image sensor's light intensity falloff function in accordance with one embodiment. As shown in FIG. 14, center point 324, representing the center of the light intensity falloff function, is at a distance of r=0; pixel 331a is at a distance of r=r1; pixel 331b is at a distance of r=r2; pixel 331c is at a distance of r=r3; and pixel 331d is at a distance of r=R, where R is the maximum radial distance from the center of the light intensity falloff function to the outer edge. As mentioned above, there are different expected noise levels for different pixels, based at least in part on how far radially the pixel is from the center of the image sensor's light intensity falloff function. As such, it is also appropriate to vary the threshold value, $\Gamma$, used in the Equations 1 and 2 above based at least in part on how far radially the pixel is from the center of the image sensor's light intensity falloff function.

Figure 15:
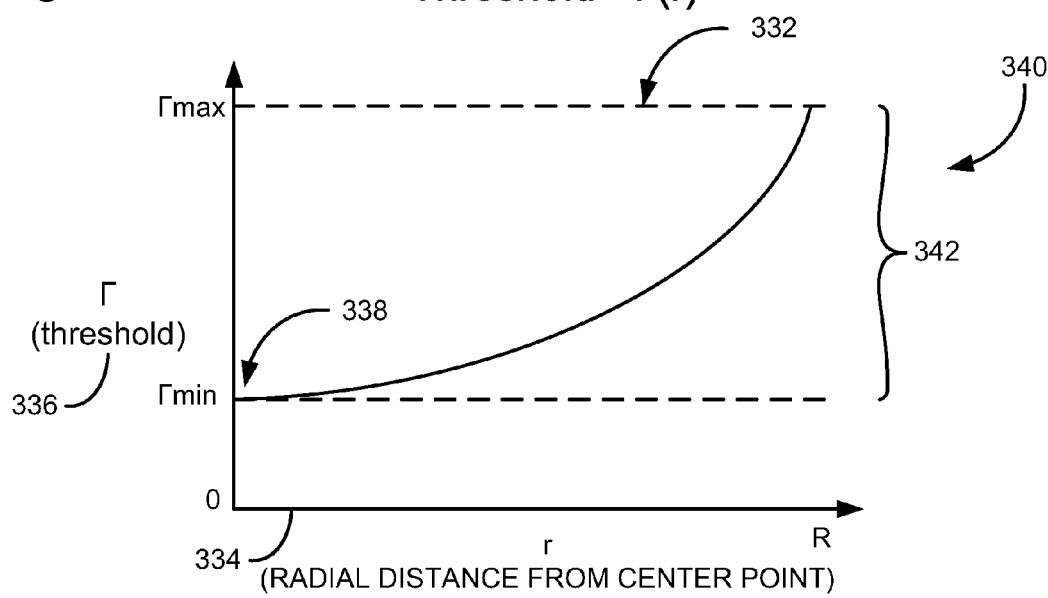
FIG. 15 illustrates a graph of a radially-dependent threshold value curve in accordance with one embodiment.

FIG. 15 illustrates a graph 340 of one such radially-dependent threshold value curve, $\Gamma(r)$, in accordance with one embodiment. As shown in graph 340, there are predefined $\Gamma max$ 332 and $\Gamma min$ 338 values over which the radially-dependent threshold value curve, $\Gamma(r)$, will span. The x-axis 334 of graph 340 represents the radial distance, r, between the current pixel and the center point 324 and ranges from 0 to R. At the center of the image sensor's light intensity falloff function, i.e., r=0, the radially-dependent threshold value curve, $\Gamma(r)$, has a value of $\Gamma min$ 338. At the corner of the image, i.e., r=R, the radially-dependent threshold value curve, $\Gamma(r)$, has a value of $\Gamma max$ 332. The y-axis 336 of graph 340 represents the threshold value, $\Gamma$, to be used in Eqns. 1 and 2 for a pixel that is a distance, r, from the center point 324 and ranges from $\Gamma min$ to $\Gamma max$. In one embodiment, the values of $\Gamma min$ and $\Gamma max$ may be determined empirically, e.g., by inspecting a series of images and then choosing $\Gamma min$ and $\Gamma max$ values that lead to acceptable noise levels in the centers of images and the corners of images, respectively. In other embodiments, the $\Gamma min$ and $\Gamma max$ may be determined computationally, that is, by running simulations varying the $\Gamma min$ and $\Gamma max$ values and measuring noise pixels in the resultant image against a known signal until the resultant noise levels reach an acceptable predefined value over a particular region of the image. The selected $\Gamma min$ and $\Gamma max$ values may then be written into the camera's firmware or stored in some other location in a device's memory. The difference between $\Gamma max$ 332 and $\Gamma min$ 338 will hereinafter be referred to as offset 342. In one embodiment, the radially-dependent threshold value curve, $\Gamma(r)$, may defined as follows:

$$\Gamma(r) = \Gamma_{min} + \left(\frac{r^2}{R^2}\right)(\text{offset}), \text{ wherein offset} = (\Gamma_{max} - \Gamma_{min}). \quad \text{(Eqn. 3)}$$

It should also be noted that, each color photosensor (e.g., red, green, or blue) shows a slightly different vignetting pattern and has a slightly different white balance. Thus, the lens will typically have a different falloff function for the various colors of light, such as red, green, blue, etc. Thus, there could be different radially-dependent threshold value curves for each color, if so desired. For example, there could be separate $C_b$ and Cr radially-dependent threshold value curves to account for the slight variations in the way in which the different colors are captured by the photosensors. For instance, red photosensors are generally more sensitive than blue photosensors due to color filter differences. However, the differences between photosensors of different colors could also be accounted for, by way of example, via the use of pre-multiplication factors in the de-Bayering process.

Figure 16:
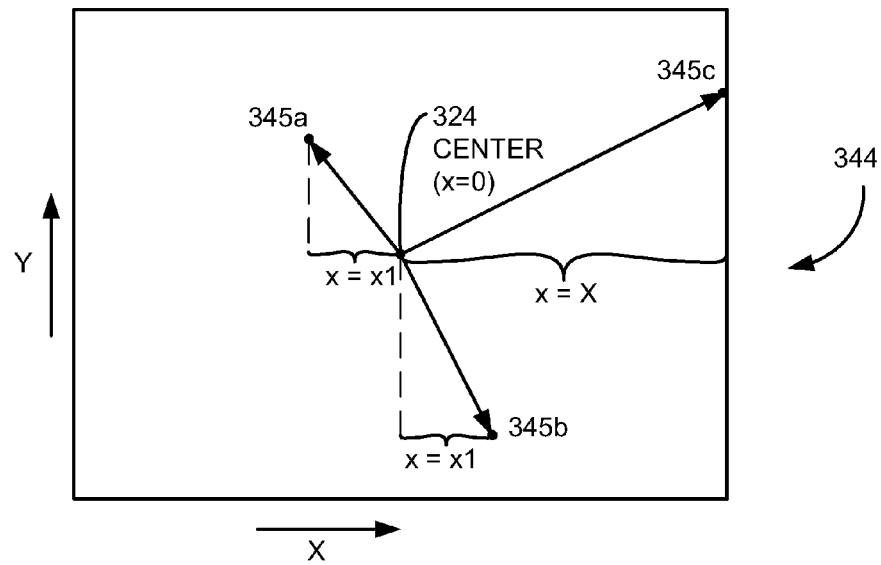
FIG. 16 illustrates a graph of various pixels with different horizontal distances from the center of the image sensor's light intensity falloff function in accordance with one embodiment.

FIG. 16 illustrates a graph 344 of various pixels with different horizontal distances from the center of the image sensor's light intensity falloff function in accordance with one embodiment. Some empirical studies have shown that, due to the more severe lens falloff at the corners of an image, varying the threshold value as a function of simply the horizontal component, x, of the radial distance from the center of the light falloff function (as opposed to the actual radial distance, r) can simplify the blurring calculations that need to be done by the camera's hardware, while still producing generally satisfactory images. As shown in FIG. 16, center point 324, representing the center of the light intensity falloff function, is at a distance of x=0; pixel 345a is at a distance of x=x1; pixel 345b is also at a distance of x=x1 (note that pixels 345a and 345b would have different radial distances, but do have the same horizontal distance); and pixel 345c is at a distance of x=X, where X is the maximum horizontal distance from the center of the image sensor's light intensity falloff function to the outer edge (note that, as depicted in FIG. 16, any pixel on the left or right edge of the image would have the maximum horizontal value, x=X, whereas only corner pixels would have the maximum radial value, r=R, as shown in FIG. 14). As mentioned above, there are different expected noise levels for different pixels, based at least in part on how far horizontally the pixel is from the center of the image sensor's light intensity falloff function. As such, it is also appropriate to vary the threshold value, $\Gamma$, used in the Equations 1 and 2 above based at least in part on how far horizontally the pixel is from the center of the image sensor's light intensity falloff function.

Figure 17:
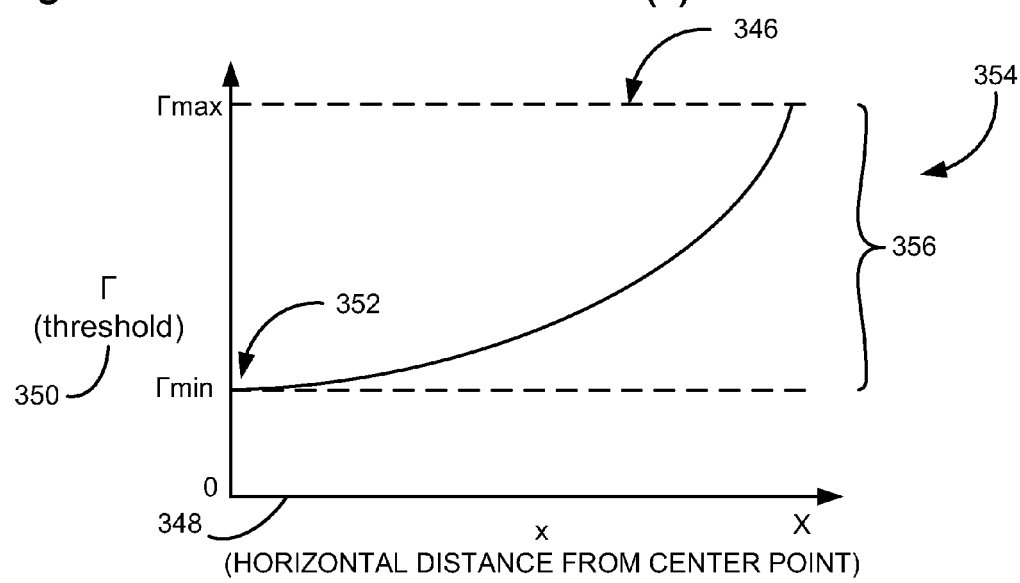
FIG. 17 illustrates a graph of a horizontally-dependent threshold value curve in accordance with one embodiment.

FIG. 17 illustrates a graph 354 of one such horizontally-dependent threshold value curve, $\Gamma(x)$, in accordance with one embodiment. As shown in graph 354, there are predefined $\Gamma$max 346 and $\Gamma$min 352 values over which the horizontally-dependent threshold value curve, $\Gamma(x)$, will span. The x-axis of graph 354 represents the horizontal distance, x, between the current pixel and the center point 324 and ranges from 0 to X. At the center of the image sensor's light intensity falloff function, i.e., x=0, the horizontally-dependent threshold value curve, $\Gamma(x)$, has a value of $\Gamma$min 352. At the corner of the image, i.e., x=X, the horizontally-dependent threshold value curve, $\Gamma(x)$, has a value of $\Gamma$max 346. The y-axis 350 of graph 354 represents the threshold value, $\Gamma$, to be used in Eqns. 1 and 2 for a pixel that is a distance, x, from the center point 324 and varies from $\Gamma$min to $\Gamma$max. In one embodiment, the values of $\Gamma$min and $\Gamma$max may be determined empirically, e.g., by inspecting a series of images and then choosing $\Gamma$min and $\Gamma$max values that lead to acceptable noise levels in the centers of images and the sides of images, respectively. The selected $\Gamma$min and $\Gamma$max values may then be written into the camera's firmware or other location in the device's memory. The difference between $\Gamma$max 352 and $\Gamma$min 346 will hereinafter be referred to as offset 356. In one embodiment, the horizontally-dependent threshold value curve, $\Gamma(x)$, may defined as follows:

$$\Gamma(x) = \Gamma_{min} + \left(\frac{x^2}{X^2}\right)(\text{offset}), \text{ wherein offset} = (\Gamma_{max} - \Gamma_{min}) \quad \text{(Eqn. 4)}$$

An added computational benefit may be achieved by using a horizontally-based threshold value function. For example, when calculating the threshold values for the pixels in an image using a horizontally-based threshold value function, the threshold value, $\Gamma(x)$, need only be calculated a single time for a given column of pixels since all of the pixels in a column are the same horizontal distance from the center point 324. Additionally there is no need to calculate distance components in the vertical direction, as there may be when attempting to calculate a radial distance, r, between a given pixel and the center point 324. While the examples described with respect to FIGS. 15 and 17 above deal with a second order polynomial threshold function, the threshold function could also be linear (i.e., a straight line) or a higher order polynomial function or any other suitable function. The choice as to the particular threshold function can be made by the designer to meet such engineering and business goals and requirements as may exist.

Another consideration when attempting to perform a radially-dependent color and edge-preserving blur is whether or not a flash was used when the image was taken. The lens falloff effect changes when a flash is used because the flash concentrates an even greater amount of light towards the center of the image sensor. This can further exacerbate the vignetting effect discussed earlier in relation to small image sensors.

Figure 18:
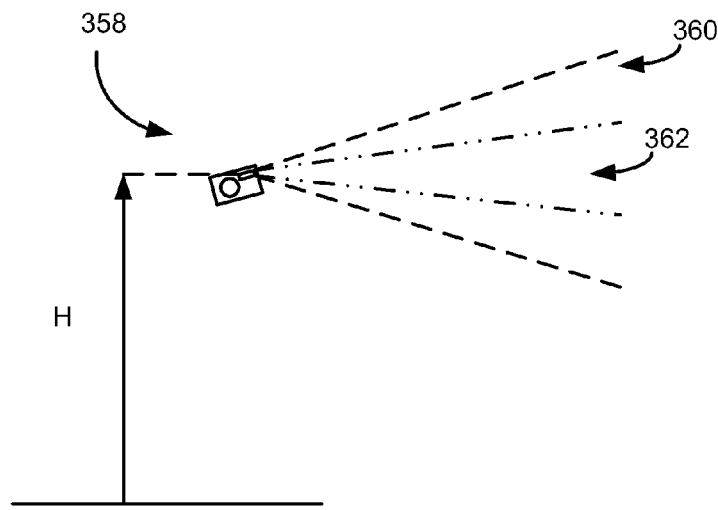
FIG. 18 illustrates exemplary light spread in a camera with and without the use of a flash in accordance with one embodiment.

FIG. 18 illustrates exemplary light spreads in a camera 358 with and without the use of a flash in accordance with one embodiment. In FIG. 18, the camera is held at a height, H, and two exemplary light spreads are shown, 360 and 362. Light spread 360 is representative of an image taken without the use of a flash. Light spread 362 is representative of an image taken with the use of a flash. Notice that light spread 362 is narrower and more concentrated towards the center of the image sensor. Due to the more concentrated light spread presented with the use of flash, pixels around the outer edges of the image sensor may be expected to show an even greater degree of noise, thus benefiting from a different horizontally or radially-dependent threshold value curve than is employed when no flash is used. The use of a flash may also affect the amount of tint in an image, which would also affect the white balance for the image.

Figure 19:
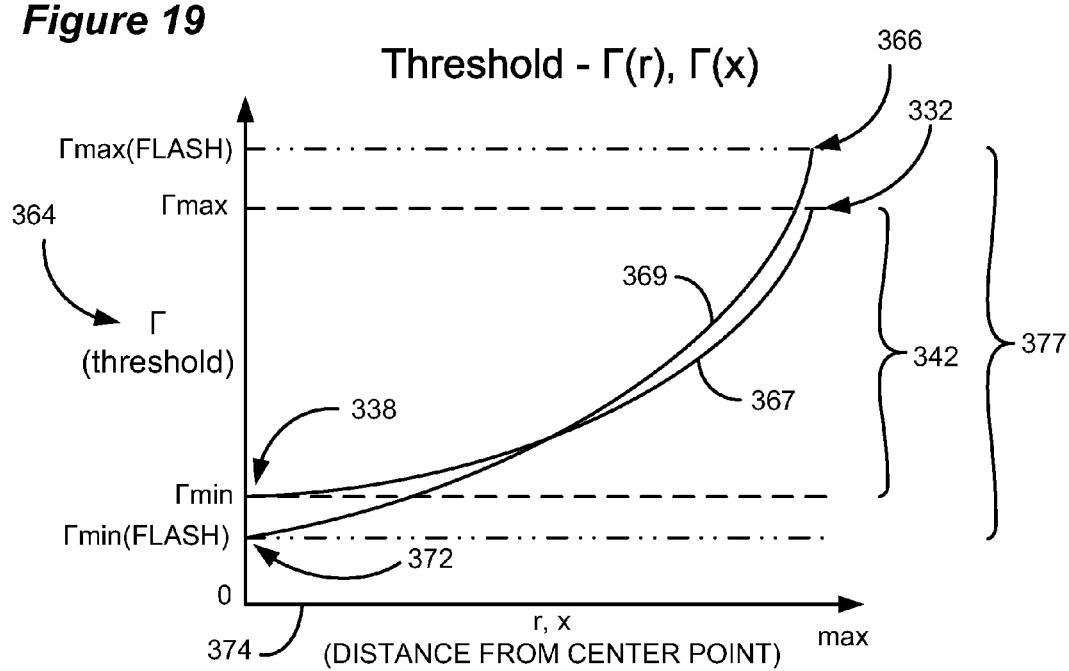
FIG. 19 illustrates a graph of radially-dependent threshold value curves for images taken with and without the use of a flash in accordance with one embodiment.

FIG. 19 illustrates a graph 364 of radially-dependent threshold value curves for images taken with and without the use of a flash in accordance with one embodiment. As with the no flash example, the values of $\Gamma$min(flash) and $\Gamma$max(flash) may be determined empirically, e.g., by inspecting a series of images taken with flash and then choosing $\Gamma$min(flash) and $\Gamma$max(flash) values that lead to acceptable noise levels in the centers of images and the corners of images, respectively. The selected $\Gamma$min(flash) and $\Gamma$max(flash) values may then be written into the camera's firmware. The difference between $\Gamma$max(flash) 372 and $\Gamma$min(flash) 366 will hereinafter be referred to as offset 377. As can be seen from graph 364, the radially-dependent threshold value curves for no flash 367 and flash 369 have different offsets, with the flash offset 377 generally being larger than the no flash offset 342. This can be attributed to the more dramatic light drop off from the center of the sensor to the edge of the sensor when a flash is used. In other words, there can be an even lower tolerance for noise near the center of the image, but the tolerance for noise near the corners of the image must be even greater than in the flash scenario than in the no flash scenario.

It may also be preferable to repeat the empirical determinations of $\Gamma$min/$\Gamma$min(flash) and $\Gamma$max/$\Gamma$max(flash) for different lens positions, e.g., with a camera having a lens that is capable of zooming, and different flash durations. Further, it may be found that any suitable function varying from $\Gamma$min to $\Gamma$max may be substituted for the Eqns. shown in Eqn. 3 and Eqn. 4. For example, for some lenses, a cubic or exponential function may produce a more accurate threshold value curve.

Figure 20:
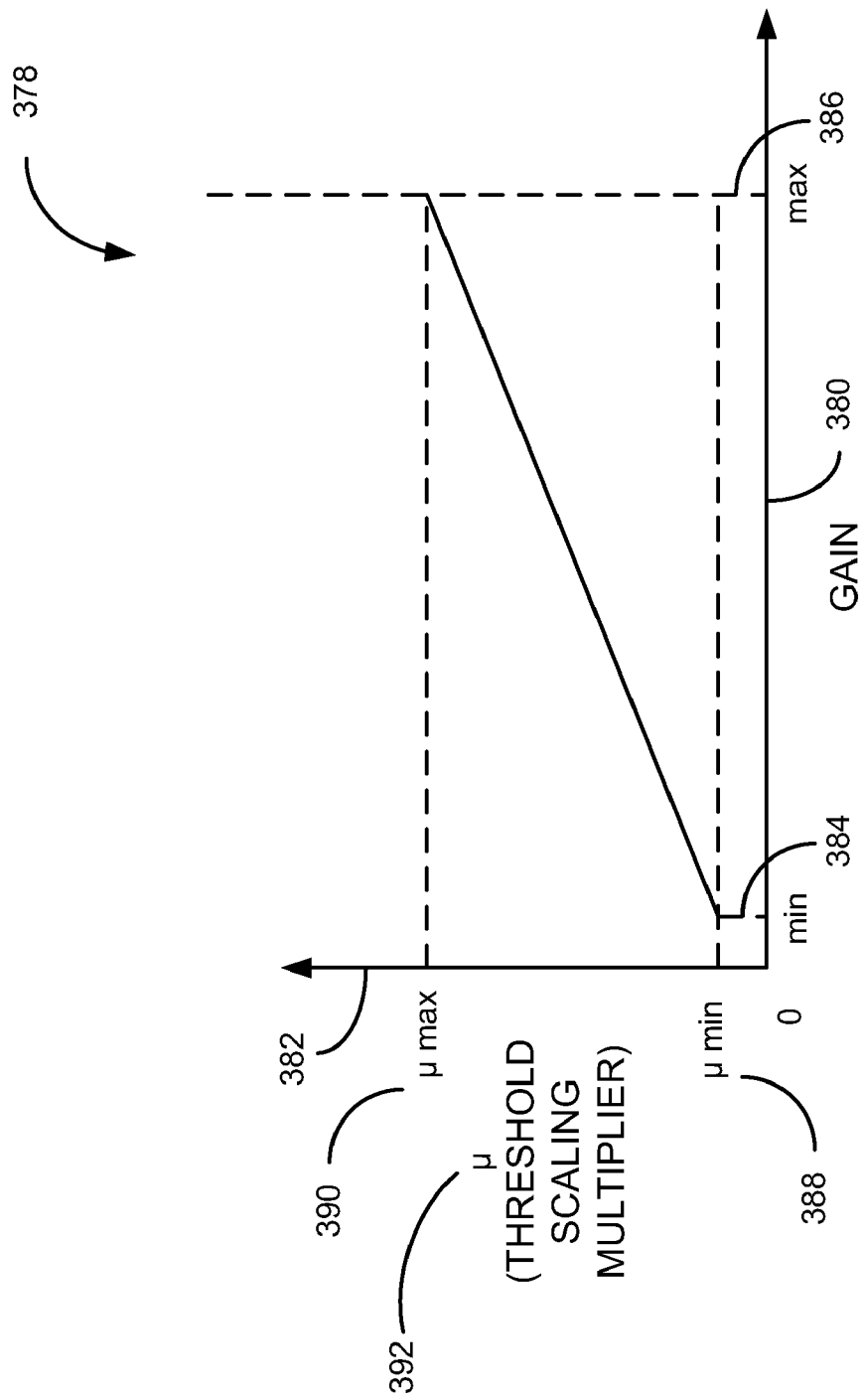
FIG. 20 illustrates a graph of threshold value scaling as a function of gain in accordance with one embodiment.

FIG. 20 is a graph 378 of a threshold scaling multiplier, $\mu$ 392, along the y-axis 382 as a function of gain along the x-axis 380, illustrating one possible embodiment for determining a threshold scaling multiplier. The threshold scaling multiplier can be used in conjunction, e.g., multiplied with, the values computed in Eqns. 3 and 4 to determine the ultimate resulting threshold value, Γ, to be used for each pixel to be used in blurring Eqns. 1 and 2, above. Although the x-axis 380 is labeled as "GAIN" in FIG. 20, any desired parameter returned from the image's metadata may be used to scale the threshold values, e.g., exposure time, gain, flash duration, or focal length. With gain level in particular, it has been empirically determined that increasing the threshold multiplier in low-light situations (e.g., those with high gains) leads to more visually pleasing images. In one embodiment, the gain levels range from a minimum value 384 of 1× to a maximum value 386 of 16×. This range of gain levels can then be linearly mapped to a scale factor, μ, that, in this case, ranges from a minimum value, μmin 388, of 1× to a maximum value, μmax 390, of 7×, serving to increase the threshold in low-light conditions. In the range between labeled elements 384 and 386, as gain increases, the threshold multiplier μ may increase linearly. At a certain gain level indicated by element 386, however, it has been empirically determined that increasing the threshold multiplier μ further will not further improve photo quality. At gain values greater than element 386, the value of μ may remain constant at μmax 390. Element 384, in the embodiment of FIG. 20, represents the minimum gain levels that would be reported by the camera. In general, in low light conditions, the gain is higher, and thus the threshold is scaled to a greater degree and thus set to a higher value. This has the effect of causing Equations 1 and 2 to find more pixels in a blur window to be similar enough in color value to the blur window's center pixel to be taken into account when blurring, thus resulting in more blurring in the image, which is generally more appropriate in low light conditions or low light regions of a particular image.

Figure 21:
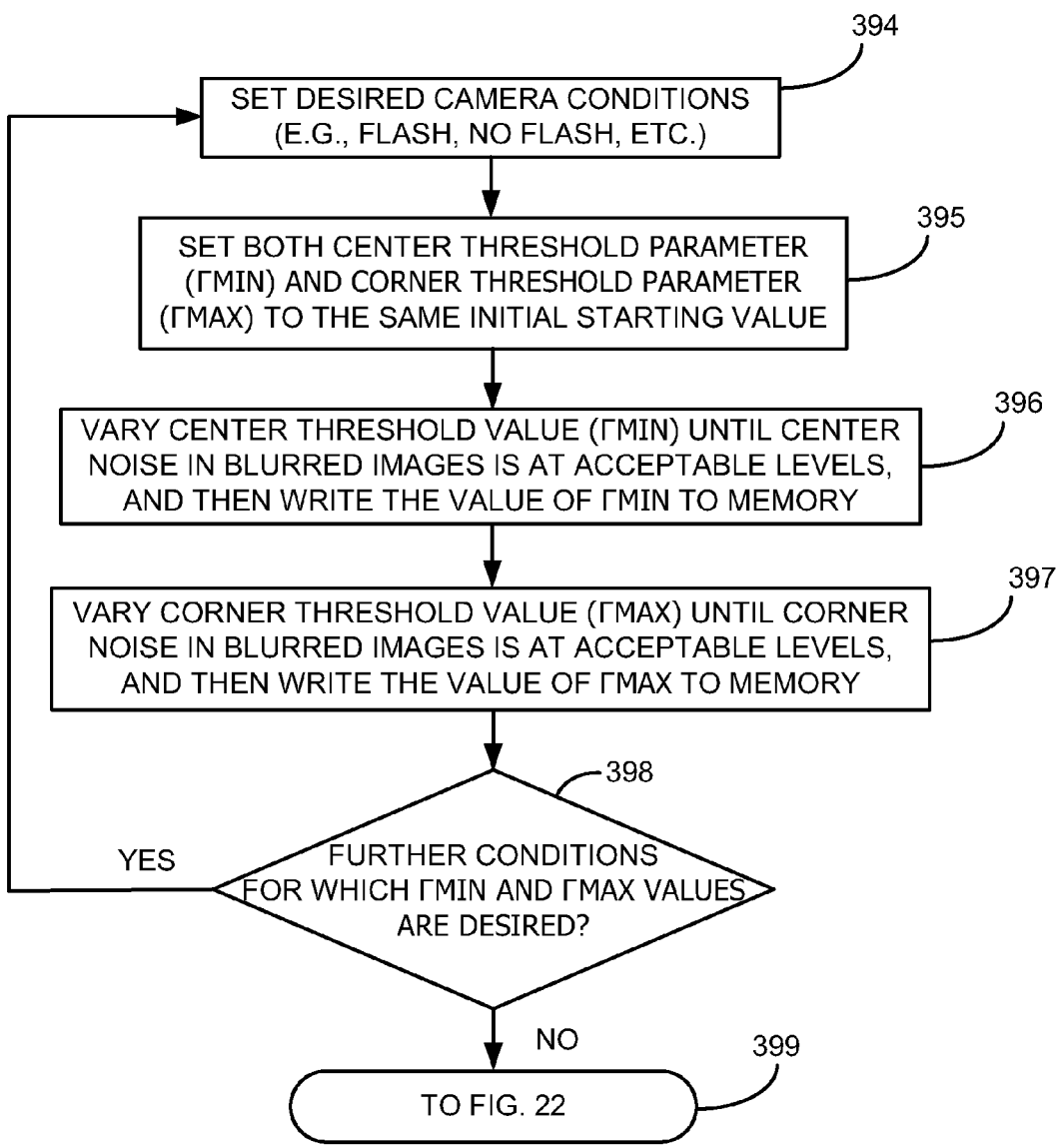
FIG. 21 illustrates, in flowchart form, one embodiment of a process for choosing center and corner noise threshold values in accordance with one embodiment.

Referring now to FIG. 21, one embodiment of a process for selecting threshold parameters, e.g., Γmin and Γmax, is illustrated in flowchart form. First, the desired camera conditions are set (e.g., flash, no flash, etc.) (Step 394). Next, both the center threshold parameter (Γmin) and corner threshold parameter (Γmax) may be set to the same initial starting value (Step 395). Various images can then be taken and blurred, e.g., according to Eqns. 1 and 2 above, with the current values for Γmin and Γmax. The value of Γmin may then be varied and the blurring process repeated until the center noise in the blurred images is deemed to be at generally acceptable levels, at which point the acceptable value of Γmin may be written and stored in the camera's memory (Step 396). Next, the value of Γmax may be varied and the blurring process repeated until the corner noise in the blurred images is deemed to be at generally acceptable levels, at which point the acceptable value of Γmax may be written and stored in the camera's memory (Step 397). If there are further camera conditions for which Γmin and Γmax values are desired (Step 398), the process may return to Step 394 and be repeated under the new camera conditions. For example, it may be desired that the process of FIG. 21 be repeated for situations where the use of a flash is employed, at various lens focal lengths, or any other number of camera parameters that it may be desired to have a radially-dependent threshold value function for. When Γmin and Γmax values have been determined for all desired camera conditions, the process may then exit (Step 399) and be used to conduct a radially-dependent chroma noise reducing blur, such as that described in relation to FIG. 22.

Figure 22:
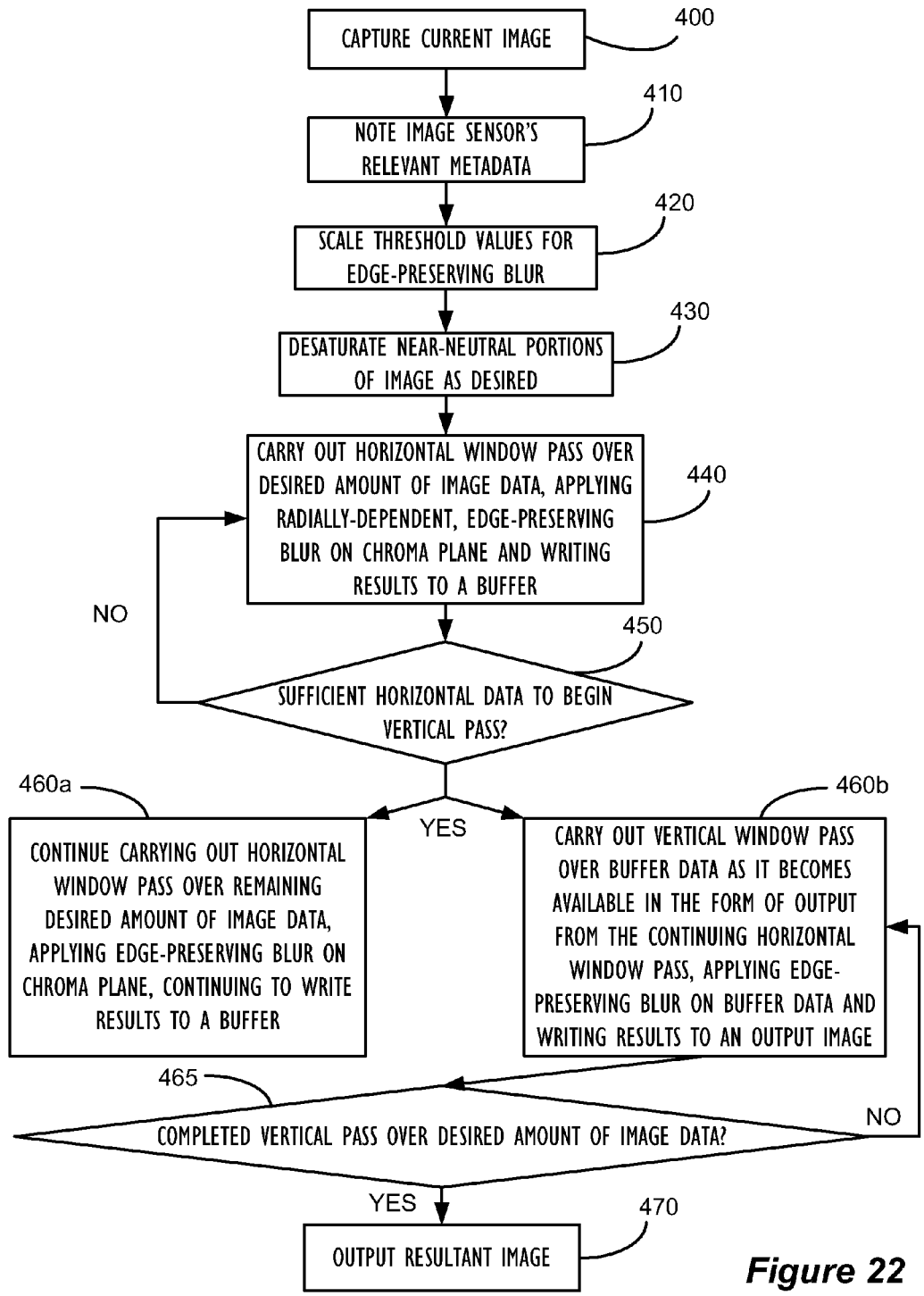
FIG. 22 illustrates, in flowchart form, one embodiment of a process for chroma noise reduction in captured images in accordance with one embodiment.

Referring now to FIG. 22, one embodiment of a process for edge-preserving chroma noise reduction is illustrated in flowchart form. First, image sensor 102 captures the current image (Step 400). Next, the ISP 150 may note the image sensor's relevant metadata, e.g., gain level or exposure time, for the current image (Step 410) and appropriately scale the predetermined, radially-dependent threshold values for each pixel based at least in part on image metadata so that the correct threshold values, Γ, are used in the blurring Eqns. 1 and 2 (Step 420). To further reduce noise artifacts in near-neutral color portions of the image, the method may desaturate the near-neutral colored pixels, essentially forcing the near-neutral colored pixels to match the neutral color value exactly (Step 430). Alternatively, Step 430 may be carried out after the blurring process completes and before Step 470. At this point, the method may begin to carry out the horizontal window pass over image data, applying a radially-dependent, edge-preserving blur on the pixels' chroma values and writing results of the blur to a memory buffer (Step 440). While the horizontal blurring is ongoing, the method may check to see if sufficient horizontal blurring data has been written to the memory buffer to begin the first vertical pass (Step 450). If there is not enough horizontal blurring data in the buffer, the method continues horizontal blurring at Step 440. If there is enough horizontal blurring data in the buffer, the method begins the vertical blurring process (Step 460*b*), passing a vertical blur window over the horizontally blurred data in the memory buffer as soon as enough data horizontally-blurred data becomes available in the buffer, all while continuing the horizontal blurring process (Step 460*a*). Alternatively, the vertical blurring process may wait until the entire horizontal blurring process is complete before beginning. Once the vertical blurring pass has completed (Step 465), the combined horizontally and vertically blurred, edge-preserved pixel data is written to an output image and may be displayed (Step 470).

Figure 23:
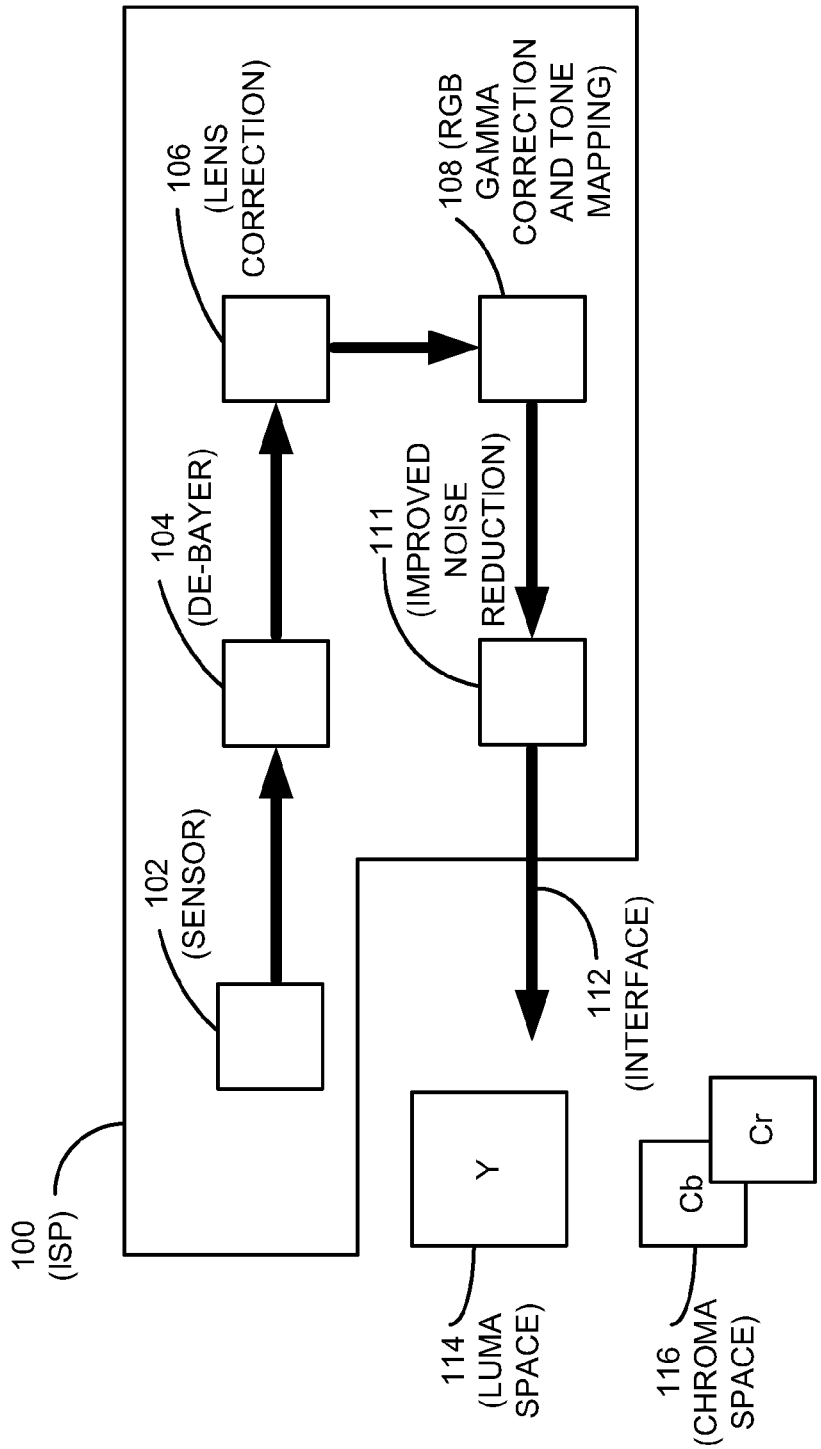
FIG. 23 illustrates an improved image sensor package for chroma noise reduction in captured images in accordance with one embodiment.

Referring now to FIG. 23, a block diagram of one embodiment of an improved ISP 150 is illustrated. ISP 150 may include a digital image sensor 102, a demosaicing or de-Bayering process 104, a lens correction module 106, RGB gamma correction and tone mapping module 108, and an improved noise reduction filter 111 for carrying out, for example, the radially-dependent, edge-preserving noise reduction blurring process described above. Finally, the image data may be passed on via interface 112 to processing unit 142 or memory unit 144 (See. FIG. 12) for further processing and/or displaying.

Figure 24:
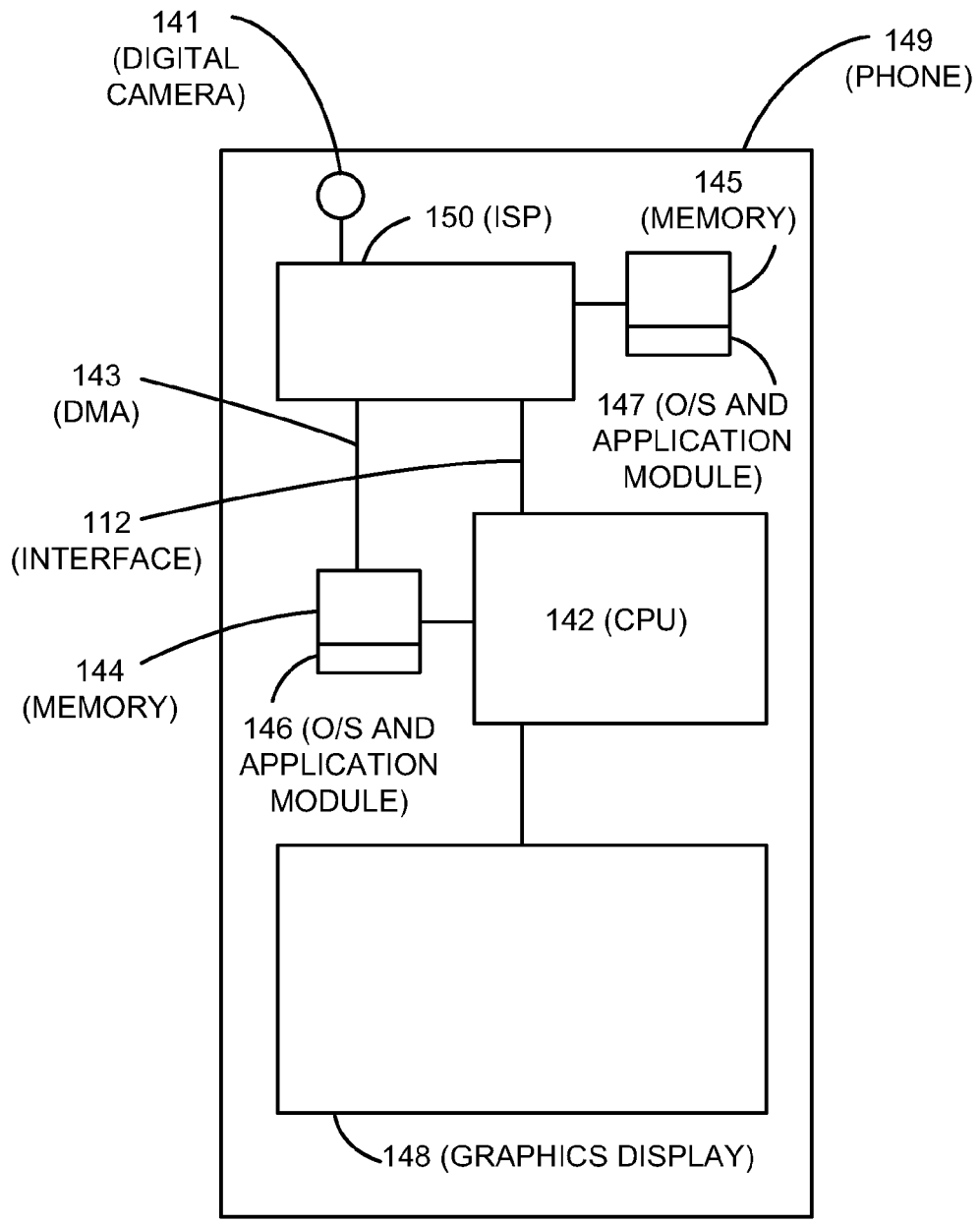
FIG. 24 illustrates one embodiment of an apparatus possessing an improved image sensor package for chroma noise reduction in captured images in accordance with one embodiment.

Referring now to FIG. 24, one embodiment of an apparatus possessing an improved ISP 150 programmed to carry out instructions for chroma noise reduction in captured images is shown. In this embodiment, a digital camera 141 comprises an image sensor configured for taking still images or video and may be integrated into a multimedia device, such as a mobile phone 149. ISP 150 may communicate with memory unit 145, which, for example, stores and retrieves the transformed pixel values from a memory buffer. Memory unit 145 is also one example of a computer readable medium wherein instructions for carrying out the chroma noise reduction procedure described above may be stored (i.e., tangibly embodied), and it may consist of ROM, EEPROM, Flash memory, or any other suitable type of memory storage medium. Within memory unit 145 is operating system and application module 147, which provides operating system services and the framework for other applications and services offered by ISP 150. ISP 150 may communicate with mobile phone 149's central processing unit (CPU) 142 via data interface 112. CPU 142 may communicate with memory unit 144, which, for example, stores various image processing constants and image data. Operating system and application module 146 may provide operating system services and the framework for other applications and services offered by phone 149, e.g., word processing, address book, email, telephone, video, and photo viewing applications. In one embodiment, the image data output from ISP 150 is sent to memory unit 144 using direct memory access (DMA) 143. After any further processing by CPU 142, the resultant data is sent out over data interface 112 to phone 149's graphic display module 148 so that the image may be rapidly displayed to the user. Any of the blocks shown in FIG. 12 may potentially be consolidated, even though shown separately in FIG. 12. For example, blocks 145 and 147 may be consolidated with block 150, or blocks 144 and 146 may be consolidated with block 142.

The foregoing description is not intended to limit or restrict the scope or applicability of the inventive concepts conceived of by the Applicants. As one example, although the present disclosure focused on the YCbCr color space and reducing noise in the chroma plane of the image; it will be appreciated that the teachings of the present disclosure can be applied to other contexts, e.g.: reducing noise levels over any value of interest, such as the brightness, or luma (Y), plane of the image; optimizing edge masks; increasing image sharpness; or determining structure versus noise in a more effective way. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. An image noise reduction system comprising:
    an image sensor;
    a memory for storing image data, the image data representative of an image and comprising a plurality of pixels and a center point, wherein the center point is representative of the center of the image sensor's light intensity falloff function; and
    a processor programmed to perform a method comprising:
        reading a first portion of the image data corresponding to a first plurality of pixels, wherein each pixel in the first plurality of pixels has a color value, and wherein one pixel within the first plurality of pixels is a first center pixel;
        computing a first value for the first plurality of pixels, wherein the first value is based at least in part on the color value of each pixel in the first plurality of pixels having a color value that differs from the color value of the first center pixel by less than a threshold value, wherein the threshold value for the first center pixel is determined at least in part by the distance between the first center pixel and the center point;
        transforming the color value of the first center pixel to be equal to the computed first value; and
        storing the transformed color value of the first center pixel in the memory.

2. The image noise reduction system of claim 1, wherein the threshold value for the first center pixel comprises a value calculated by evaluating a radially-dependent threshold value function.

3. The image noise reduction system of claim 2, wherein the radially-dependent threshold value function has a predetermined minimum value, $\Gamma_{min}$, and a predetermined maximum value, $\Gamma_{max}$.

4. The image noise reduction system of claim 3, wherein the values of $\Gamma_{min}$ and $\Gamma_{max}$ are determined empirically.

5. The image noise reduction system of claim 3, wherein the values of $\Gamma_{min}$ and $\Gamma_{max}$ are determined computationally.

6. The image noise reduction system of claim 2, further comprising a flash, wherein the radially-dependent threshold value function that is evaluated is different for images taken with the use of the flash and images taken without the use of the flash.

7. The image noise reduction system of claim 1, wherein the threshold value for the first center pixel is calculated using the formula:

$$\Gamma(r) = \Gamma_{min} + \left(\frac{r^2}{R^2}\right)(\Gamma_{max} - \Gamma_{min}),$$

wherein r is the radial distance between the first center pixel and the center point, R is the maximum radial distance between a pixel in the image and the center point, $\Gamma_{min}$ is the predetermined threshold value where r=0, and $\Gamma_{max}$ is the predetermined threshold value where r=R.

8. The image noise reduction system of claim 1, wherein the threshold value for the first center pixel is calculated using the formula:

$$\Gamma(x) = \Gamma_{min} + \left(\frac{x^2}{X^2}\right)(\Gamma_{max} - \Gamma_{min}),$$

wherein x is the horizontal distance between the first center pixel and the center point, X is the maximum horizontal distance between a pixel in the image and the center point, $\Gamma_{min}$ is the predetermined threshold value where x=0, and $\Gamma_{max}$ is the predetermined threshold value where x=X.

9. The image noise reduction system of claim 1, wherein the threshold value for the first center pixel comprises a value calculated by evaluating a piecewise-defined threshold value function that changes in value only at discrete distance intervals from the center point.

10. The image noise reduction system of claim 1, wherein the threshold value comprises a dynamically scaled value for each image.

11. The image noise reduction system of claim 10, wherein the degree of threshold value scaling is determined at least in part by image metadata.

12. The image noise reduction system of claim 11, wherein the image metadata comprises one or more of: exposure time, gain, flash duration, and focal length.

13. The image noise reduction system of claim 1, wherein the threshold value for the first center pixel comprises a value calculated by evaluating a polynomial function.

14. The image noise reduction system of claim 1, wherein the processor is further programmed to:
    read a second portion of the image data corresponding to a second plurality of pixels, wherein each pixel in the second plurality of pixels has a transformed color value stored in the memory, and wherein one pixel within the second plurality of pixels is a second center pixel;
    compute a second value for the second plurality of pixels, wherein the second value is based at least in part on the transformed color value of each pixel in the second plurality of pixels having a transformed color value that differs from the transformed color value of the second center pixel by less than a threshold value, wherein the threshold value for the second center pixel is determined at least in part by the distance between the second center pixel and the center point;
    replace the transformed color value of the second center pixel with the computed second value; and store the replaced color value of the second center pixel in the memory.

15. A method of reducing noise in an image using an image processor comprising:
receiving image data from an image sensor, wherein the image data is representative of an image and comprises a plurality of pixels and a center point, wherein each pixel has a color value, and wherein the center point is representative of the center of the image sensor's light intensity falloff function;
blurring each pixel within at least a first portion of the plurality of pixels, wherein the blurring of a single pixel within the first portion of the plurality of pixels comprises:
computing a blurred value for the single pixel using a formula that only considers other pixels within the first portion of the plurality of pixels that are within a predetermined distance from the single pixel and that possess a color value that differs from the color value of the single pixel by less than a threshold value, wherein the threshold value for the single pixel is determined at least in part by the distance between the single pixel and the center point;
transforming the color value of each pixel in the first portion of the plurality of pixels to be equal to the computed blurred value for the pixel; and
storing the transformed color value of each pixel in the first portion of the plurality of pixels in a memory.

16. The method of claim 15, wherein the threshold value for the single pixel is calculated by evaluating a radially-dependent threshold value function.

17. The method of claim 16, wherein the radially-dependent threshold value function has a predetermined minimum value, $\Gamma_{min}$, and a predetermined maximum value, $\Gamma_{max}$.

18. The method of claim 16, wherein the radially-dependent threshold value function that is evaluated is different for images taken with the use of a flash and images taken without the use of a flash.

19. The method of claim 15, wherein the threshold value for the single pixel is calculated by evaluating a piecewise-defined threshold value function that changes in value only at discrete distance intervals from the center point.

20. The method of claim 15, wherein the threshold value for the single pixel is scaled dynamically based at least in part on image metadata.

21. An apparatus, comprising:
an image sensor;
memory operatively coupled to the image sensor for receiving image data, wherein the image data is representative of an image and comprises a plurality of pixels and a center point, wherein each pixel has a value of interest, and wherein the center point is representative of the center of the image sensor's light intensity falloff function; and
a processor unit operatively coupled to the memory, the memory comprising instructions for causing the processor unit to:
read a first portion of the image data corresponding to a first plurality of pixels, wherein one pixel within the first plurality of pixels is a first center pixel;
compute a first blurred value for the first plurality of pixels, wherein the first blurred value is based at least in part on the value of interest of each pixel in the first plurality of pixels having a value of interest that differs from the value of interest of the first center pixel by less than a threshold value, wherein the threshold value for the first center pixel is determined at least in part by the distance between the first center pixel and the center point;
transform the value of interest of the first center pixel to be equal to the computed first blurred value; and
store the transformed value of interest of the first center pixel in the memory.

22. The apparatus of claim 21, wherein the processor unit is further programmed to:
read a second portion of the image data corresponding to a second plurality of pixels, wherein each pixel in the second plurality of pixels has a transformed value of interest stored in the memory, and wherein one pixel within the second plurality of pixels is a second center pixel;
compute a second blurred value for the second plurality of pixels, wherein the second blurred value is based at least in part on the transformed value of interest of each pixel in the second plurality of pixels having a transformed value of interest that differs from the transformed value of interest of the second center pixel by less than a threshold value, wherein the threshold value for the second center pixel is determined at least in part by the distance between the second center pixel and the center point;
replace the transformed value of interest of the second center pixel with the computed second blurred value; and
store the replaced value of interest of the second center pixel in the memory.

23. The apparatus of claim 21, wherein the threshold value for the first center pixel is calculated by evaluating a radially-dependent threshold value function.

24. The apparatus of claim 21, wherein the threshold value for the first center pixel is scaled dynamically based at least in part on image metadata.

25. A non-transitory computer usable medium having a computer readable program code embodied therein, wherein the computer readable program code is adapted to be executed to implement the method of claim 15.

* * * * *